United States Patent
Quinlan et al.

(10) Patent No.: US 11,750,235 B2
(45) Date of Patent: Sep. 5, 2023

(54) RADIO FREQUENCY RECEIVER CIRCUIT

(71) Applicant: Analog Devices International Unlimited Company, Limerick (IE)

(72) Inventors: Philip Eugene Quinlan, Glounthaune (IE); Joana Rochelle Ortiz Maramba, Puting Kahoy (PH); Catherine Francisco Andaya, Metro Manila (PH); Erwin Paul Ramos Santiago, Las Pinas (PH); Vernon H. Valles, Karangalan Village (PH); Juan Miguel Judit Ugsimar, Las Pinas (PH)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/357,699

(22) Filed: Jun. 24, 2021

(65) Prior Publication Data
US 2022/0416828 A1    Dec. 29, 2022

(51) Int. Cl.
*H04B 1/16* (2006.01)
*H04B 1/18* (2006.01)
*H04B 1/30* (2006.01)

(52) U.S. Cl.
CPC ............ *H04B 1/1607* (2013.01); *H04B 1/18* (2013.01); *H04B 2001/307* (2013.01)

(58) Field of Classification Search
CPC ... H04B 1/1607; H04B 1/18; H04B 2001/307
See application file for complete search history.

(56) References Cited

U.S. PATENT DOCUMENTS

| | | | |
|---|---|---|---|
| 7,702,039 B2 | 4/2010 | Gieske et al. | |
| 8,077,818 B2* | 12/2011 | Abe | H04B 1/0007 455/208 |
| 8,774,748 B2 | 7/2014 | Casagrande et al. | |
| 2002/0102957 A1 | 8/2002 | Tseng et al. | |
| 2007/0127634 A1* | 6/2007 | Katsumi | H04M 1/656 379/67.1 |
| 2008/0112519 A1* | 5/2008 | Jung | H04B 1/30 375/350 |

FOREIGN PATENT DOCUMENTS

WO    WO-9208294 A1    5/1992

* cited by examiner

*Primary Examiner* — Janice N Tieu
(74) *Attorney, Agent, or Firm* — Schwegman Lundberg & Woessner, P.A.

(57) ABSTRACT

A radio frequency, RF, receiver circuit is configured to simultaneously monitor a two or more different RF frequencies. The RF receiver circuit uses a sub-sampler to sub-sample an RF signal that is at any of the monitored RF frequencies, and the sub-sampled signal is then demodulated and a digital code that was encoded in the RF signal is recovered. The RF receiver circuit may be particularly low power, in part owing to using the same sub-sampler for each of the two or more monitored RF frequencies, and not relying on superheterodyning. Furthermore, monitoring two or more different RF frequencies simultaneously means that signals received on the monitored RF frequencies may be acted on very quickly. These characteristics make the RF receiver circuit particularly suitable for use in low-power wake-up receivers, such as Bluetooth Low Energy (BLE) wake-up receivers.

21 Claims, 12 Drawing Sheets

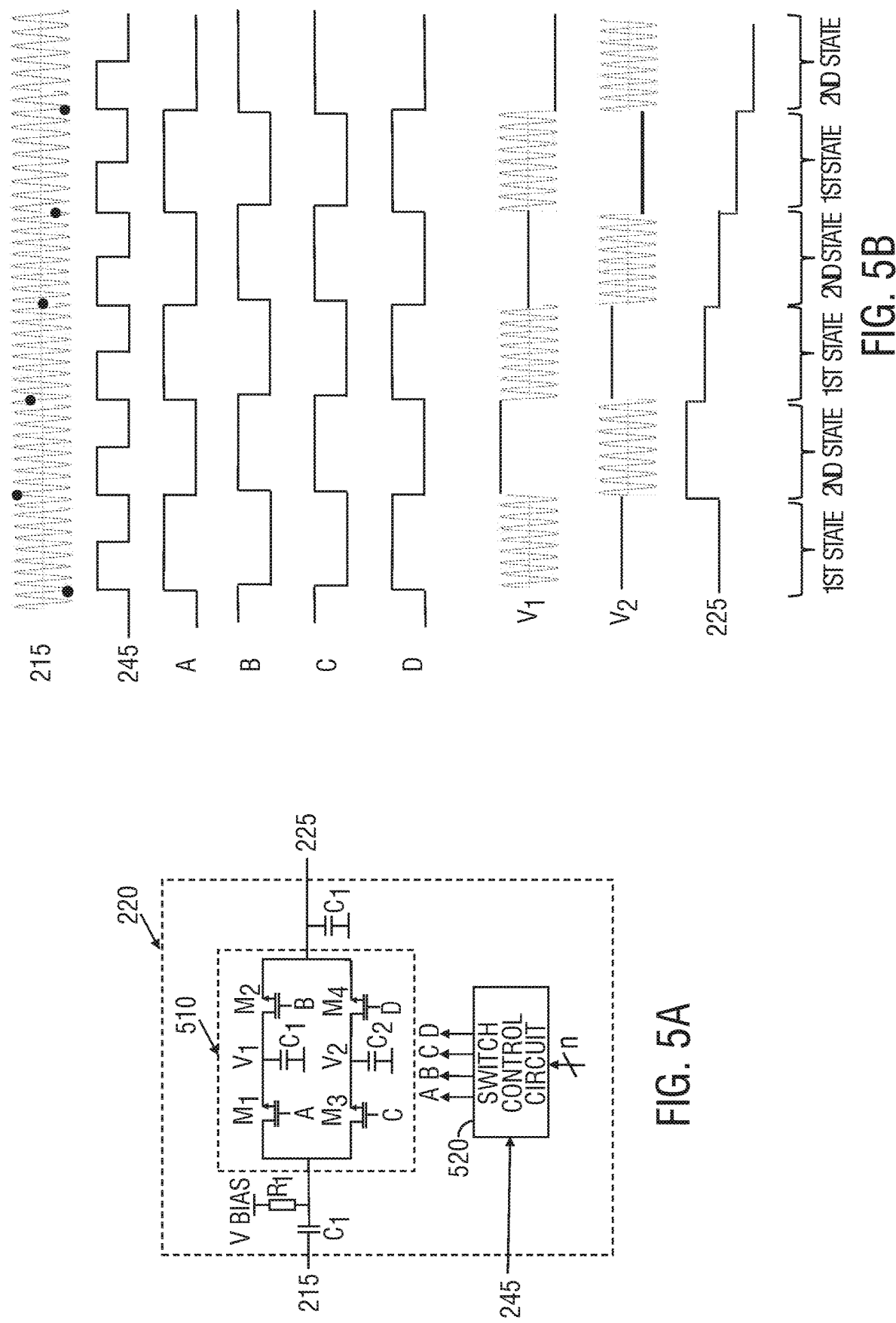

RADIO FREQUENCY RECEIVER CIRCUIT

TECHNICAL FIELD

The present disclosure relates to a receiver circuit configured to receive radio frequency signals.

BACKGROUND

Many wireless devices, such as a sensor devices/nodes, are configured so that they are often operating in a dormant state in order to conserve power, and then from time to time wake up in order to perform their function, such as measuring a parameter and wirelessly reporting the measurement. Some such devices are configured autonomously to duty cycle between a dormant state and an awake state. However, this tends to increase data access latency and results in a trade-off between reduced power consumption and reduced latency. In particular, the less time the device spends in a dormant state, the lower the latency but the higher the power consumption.

For some wireless devices it may be desirable to communicate with them quickly, on demand, rather than wait until they autonomously wake-up. For example, in healthcare applications it may be important quickly to obtain sensor readings, or instruct a wireless device to perform a particular action, and waiting for it autonomously to wake up according to its programmed duty cycle could be problematic.

In view of this, some wireless devices are configured with a wake-up receiver. The wake-up receiver is typically coupled to the antenna of the device (or coupled to its own dedicated antenna within the device) and is configured to listen for a wake-up signal issued by a remote entity and received via the antenna of the wireless device. When a wake-up signal is received, the wake-up receiver is configured to issue a wake-up command to one or more other parts of the wireless device. For example, it may issue a wake-up command to the main communications transceiver of the wireless device so that further instructions/commands may be received from the remote entity and/or data may be communicated from the wireless device to the remote entity. Using a wake-up receiver may decouple power saving from latency, by enabling the wireless device to remain in a dormant state until the functionality of the wireless device is required. However, if the wake-up receiver is to remain on all the time, thereby minimising latency, it is important to be very low power, which can be incompatible with many communications protocols/architectures.

Furthermore, some wireless devices (including wake-up receivers) may be configured to receive communications on multiple different frequency bands. For example, the Bluetooth Low Energy (BLE) technology includes three advertising frequencies on which a remote entity might advertise that they wish to establish a communications session with the wireless device. In order to monitor multiple frequencies at once (for example, so that a remote entity can use any or all of the available advertising frequencies), wireless devices may be configured to scan between the different frequencies, so that at any one time they are monitoring only one of the frequencies. This may increase latency, since an advertising communication on a particular frequency from a remote entity would only be detected when the wireless device happens to be monitoring the particular frequency. Alternatively, the wireless device may be configured to have multiple independent receivers, for example multiple independent superhet receivers, each tuned to one of the advertising channels so that multiple channels can be monitored simultaneously. However, this represents a significant additional financial cost and significantly increases power consumption.

SUMMARY

This disclosure relates to a radio frequency, RF, receiver circuit that is configured to simultaneously monitor two or more different RF frequencies. The RF receiver circuit uses a sub-sampler to sub-sample an RF signal that is at any of the monitored RF frequencies, and the sub-sampled signal is then demodulated and a digital code that was encoded in the RF signal is recovered. The RF receiver circuit may be particularly low power, in part owing to using the same sub-sampler for each of the two or more monitored RF frequencies, and not relying on superheterodyning. Furthermore, monitoring two or more different RF frequencies simultaneously means that signals received on the monitored RF frequencies may be acted on very quickly. These characteristics make the RF receiver circuit particularly suitable for use in low-power wake-up receivers, such as Bluetooth Low Energy (BLE) wake-up receivers, or wake-up receivers using wireless standards such as ANT, Bluetooth Classic (BT), or IEEE 802.15.4.

In a first aspect of the disclosure, there is provided a radio-frequency, RF, receiver circuit, for monitoring simultaneously a plurality of frequencies, the RF receiver circuit comprising: a sub-sampler configured to: receive an RF signal at any of the plurality of RF frequencies; receive from a local oscillator a first oscillating signal having a first oscillator frequency; and sub-sample, using the first oscillating signal, the received RF signal in order to generate and output a sub-sampled signal; and a signal processing system coupled to an output of the sub-sampler and configured to: receive the sub-sampled signal from the output of the sub-sampler; demodulate the sub-sampled signal; and recover from the demodulated sub-sampled signal a digital code that is encoded within the RF signal.

The signal processing system may comprise a first demodulation path coupled to the output of the sub-sampler via a first coupling path, the first demodulation path comprising: a first demodulator having an operational centre frequency that is a first intermediate frequency and being configured to demodulate the sub-sampled signal, wherein the first oscillator frequency is such that for a first frequency of the plurality of frequencies, a frequency of the sub-sampled signal is the first intermediate frequency.

The first oscillator frequency may be such that for a second frequency of the plurality of frequencies, the frequency of the sub-sampled signal is the first intermediate frequency.

The oscillator frequency may be such that for a third frequency of the plurality of frequencies, the frequency of the sub-sampled signal is a second intermediate frequency.

The RF receiver circuit may further comprise a second demodulation path coupled to the output of the sub-sampler, the second demodulation path comprising: a mixer configured to modify the frequency of the sub-sampled signal such that when the frequency of the sub-sampled signal is the second intermediate frequency, an output of the mixer comprises a signal having a third intermediate frequency; and a second demodulator coupled to the output of the mixer and having an operational centre frequency that is the third intermediate frequency, the second demodulator being configured to demodulate the signal having the third intermediate frequency.

The second demodulation path may further comprise a filter configured to allow signals at the third intermediate frequency to pass, wherein the second modulator is coupled to the output of the mixer via the filter such that the filter allows the signal at the third intermediate frequency to pass from the output of the mixer to the second demodulator.

The third intermediate frequency may be equal to the first intermediate frequency.

The mixer may be further configured to: receive a second oscillating signal having a second oscillator frequency; and mix the sub-sampled signal with the second oscillator signal, and wherein the RF receiver circuit further comprises a divider circuit configured to divide the first oscillating signal by a predetermined amount to generate the second oscillating signal.

The digital code may comprise a preamble portion, and wherein the RF receiver further comprises an automatic frequency control, AFC, determination circuit configured to: determine, using the preamble portion of the digital code, a difference between a frequency of the signal demodulated by the first demodulator and the operational centre frequency of the first demodulator; and determine a frequency error correction signal based on the difference between the frequency of the signal demodulated by the first demodulator and the operational centre frequency of the first demodulator.

The frequency error correction signal may comprise an oscillator correction signal for use in adjusting the first oscillator frequency in such a way as to reduce the difference between the frequency of the signal demodulated by the first demodulator and the operational centre frequency of the first demodulator.

The frequency error correction signal may comprise a first demodulation correction signal for use in adjusting a delay used by the first demodulator in such a way as to compensate for the difference between the frequency of the signal demodulated by the first demodulator and the operational centre frequency of the first demodulator.

The AFC determination circuit may further comprise an inverter configured to set, prior to determining the frequency error correction signal, a sign of the difference between the frequency of the signal demodulated by the first demodulator and the operational centre frequency of the first demodulator.

The RF receiver circuit may be a wake-up receiver, and wherein the RF receiver circuit further comprises a wake-up assertion entity configured to: compare the digital code to one or more predetermined wake-up codes; and if the digital code matches any of the one or more wake-up codes, output a wake-up assertion signal.

The RF receiver circuit may further comprise an RF front end for coupling to an RF antenna and configured to filter a signal received from the RF antenna and output the RF signal to the sub-sampler, wherein the RF front end comprises a plurality of bandpass filters each centred on a respective one of the plurality of frequencies.

The sub-sampler may comprise: a switching circuit configured to receive the RF signal and output the sub-sampled signal; and a switching control circuit configured to control a timing of the switching circuit using the first oscillator signal, such that the RF signal is sampled by the switching circuit and the sub-sampler presents a substantially constant impedance at its input.

The switching circuit may comprise: a first sampling path comprising a first sampling device; and a second sampling path comprising a second sampling device; wherein the switching circuit is configured to be controllable by the switching control circuit to alternative between: a first state wherein the switching circuit presents the first sampling device at the input of the sub-sampler such that the RF signal is applied to the first sampling device and presents the second sampling device at the output of the sub-sampler such that a preceding sample is output from the second sampling device as the sub-sampled signal; and a second state wherein the switching circuit presents the second sampling device at the input of the sub-sampler such that the RF signal is applied to the second sampling device and presents the first sampling device at the output of the sub-sampler such that a preceding sample is output from the first sampling device as the sub-sampled signal.

The switching control circuit may be configured to operate the switching circuit in the first state for a first amount of time and the second state for a second amount of time, wherein the first amount of time and the second amount of time are of equal duration, and wherein the duration of the first amount of time and the second amount of time is a multiple of a period of the first oscillator signal.

The first sampling device and the second sampling device may be capacitors having the same impedance.

Each of the plurality of frequencies may be Bluetooth Low Energy (BLE) or Bluetooth (BT) Classic, advertising frequencies, and wherein the digital code is encoded within the RF signal using a Gaussian frequency shift key, GFSK, modulation scheme.

In a second aspect of the disclosure there is provided a method for simultaneously monitoring a plurality of RF communications frequencies, the method comprising: receiving, at a sub-sampler, an RF signal at any of the plurality of RF communications frequencies and a first oscillating signal having a first oscillator frequency; sub-sampling the RF signal using the first oscillating signal; demodulating the sub-sampled signal; and recovering from the demodulated sub-sampled signal a digital code that is encoded within the RF signal.

In a third aspect of the disclosure, there is provided a Bluetooth Low Energy (BLE), or Bluetooth (BT) Classic wake-up receiver for use in a wireless communications device, the wake-up receiver being configured to: receive a radio frequency, RF, signal on a BLE advertising frequency, wherein the RF signal is modulated with a digital code using a Gaussian frequency shift key, GFSK, modulation scheme according to the BLE standard; recover the digital code from the RF signal; compare the digital code to one or more predetermined wake-up codes; and if the digital code matches any of the one or more predetermined wake-up codes, output a wake-up signal to one or more other units within the wireless communications device.

DRAWINGS

Aspects of the present disclosure are described, by way of example only, with reference to the following drawings, in which:

FIG. 5A shows a schematic representation of an example circuit design for the sub-sampler of the RF receiver circuit of FIG. 3;

FIG. 5B shows an example timing diagram to visual the operation of the sub-sampler of FIG. 5A;

Figure 9A:
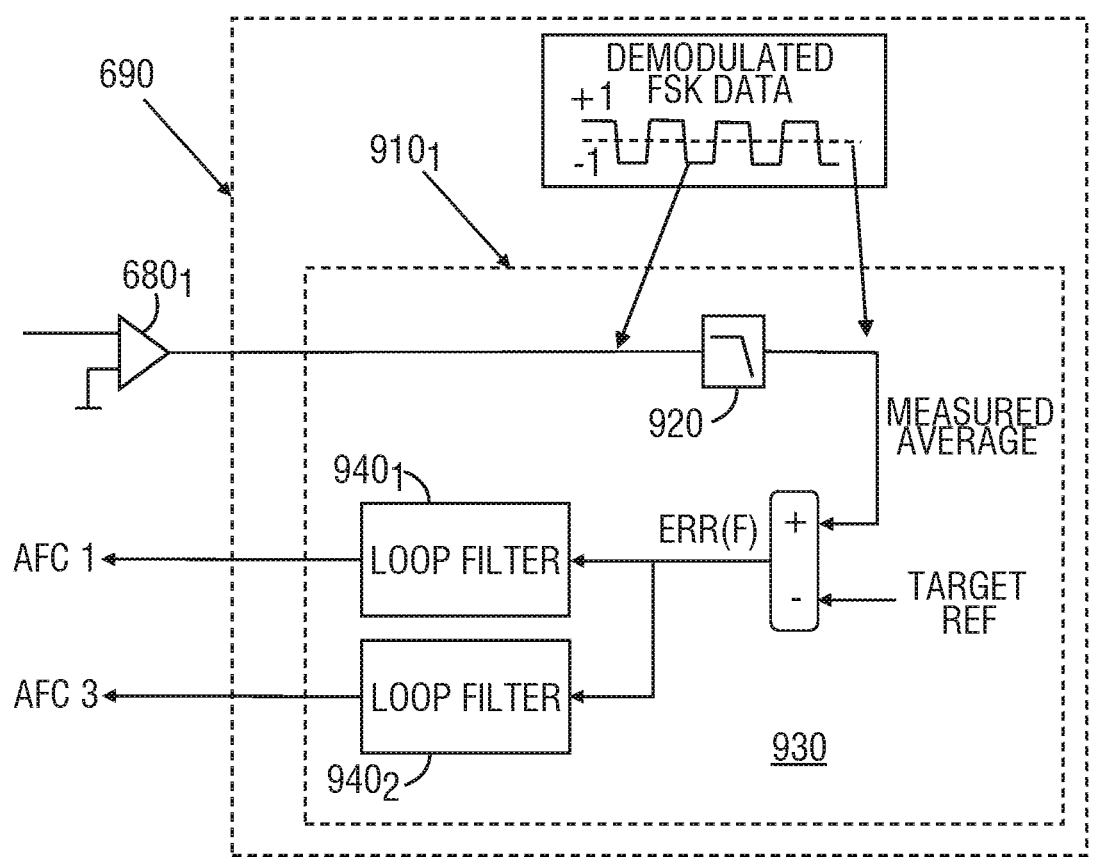
FIG. 9A shows a schematic representation of an example implementation of an AFC determination circuit for use in the signal processing system of FIG. 6.
Figure 10:
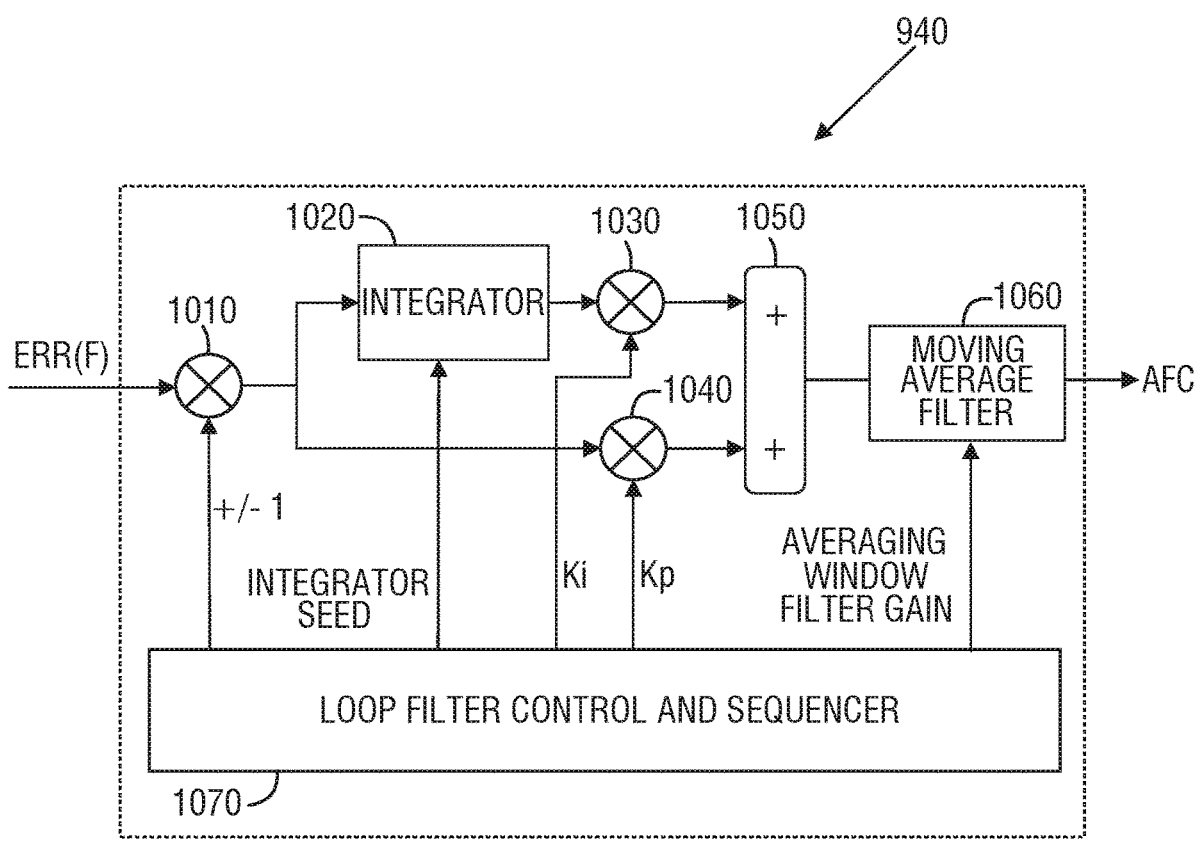
Figure 11:
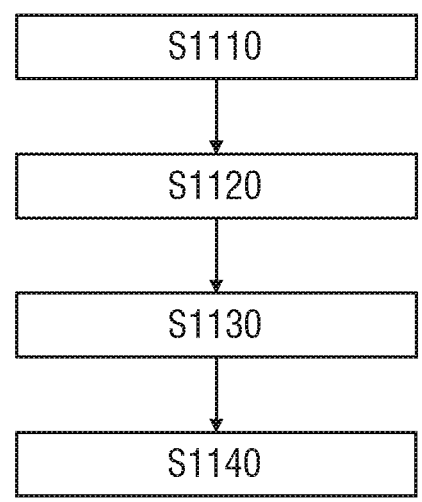

FIG. 10 a schematic representation of an example implementation of a loop filter in the AFC determination circuit of FIG. 9A; and FIG. 11 visualises example steps of a method of simultaneously monitoring a plurality of RF communications frequencies in accordance with an aspect of the disclosure.

DETAILED DESCRIPTION

RF receivers can use superheterodyning techniques to mix received RF signals down to an intermediate frequency, where the digital code encoded in the RF signal is then recovered. However, superheterodyning is quite power intensive as it requires an RF local oscillator synthesiser and therefore does not lend itself well to wake-up receivers, Furthermore, the intermediate frequency in a superheterodyne (superhet) receiver is typically defined as the difference between the RF signal and the local oscillator signal used for superheterodyning. This means that a single receiver can monitor only a single RF frequency at a time, since the components downstream will be tuned to a particular intermediate frequency meaning that local oscillator frequency needs to be tuned to a different frequency for each different RF Channel frequency it monitors so that the difference of the RF signal and the local oscillator signal is always at the intermediate frequency. This means that if two or more different RF frequencies need to be monitored, either two or more separate receiver circuits are required, which increases power consumption even further, or a single RF receiver can switch between the frequencies to be monitored by changing the local oscillator frequency, but then can monitor only one particular RF frequency at a time. Monitoring only one RF frequency at any given time means that signals transmitted on any of the other RF frequencies may be missed, If such an RF receiver is used in a wake-up receiver, this would increase the undesirable latency of the wake-up receiver.

The present disclosure relates to a low power RF receiver circuit that may be particularly useful for wake-up receivers (although its uses are not limited only to wake-up receivers). The RF receiver circuit can monitor two or more different RF frequencies simultaneously, which significantly reduces latency for wake-up circuits. Furthermore, the RF receiver circuit can use a single sub-sampler to reduce the frequency of the RF signal down to a predetermined intermediate frequency for digital code recovery. Using a single subsampler is significantly lower power than using a superheterodyning mixer, employing an RF synthesizer with embedded LC tank VCO operating at RF frequencies. As a result, the RF receiver circuit of the present disclosure can be used to achieve very low latency at very low levels of power consumption.

Figure 1:
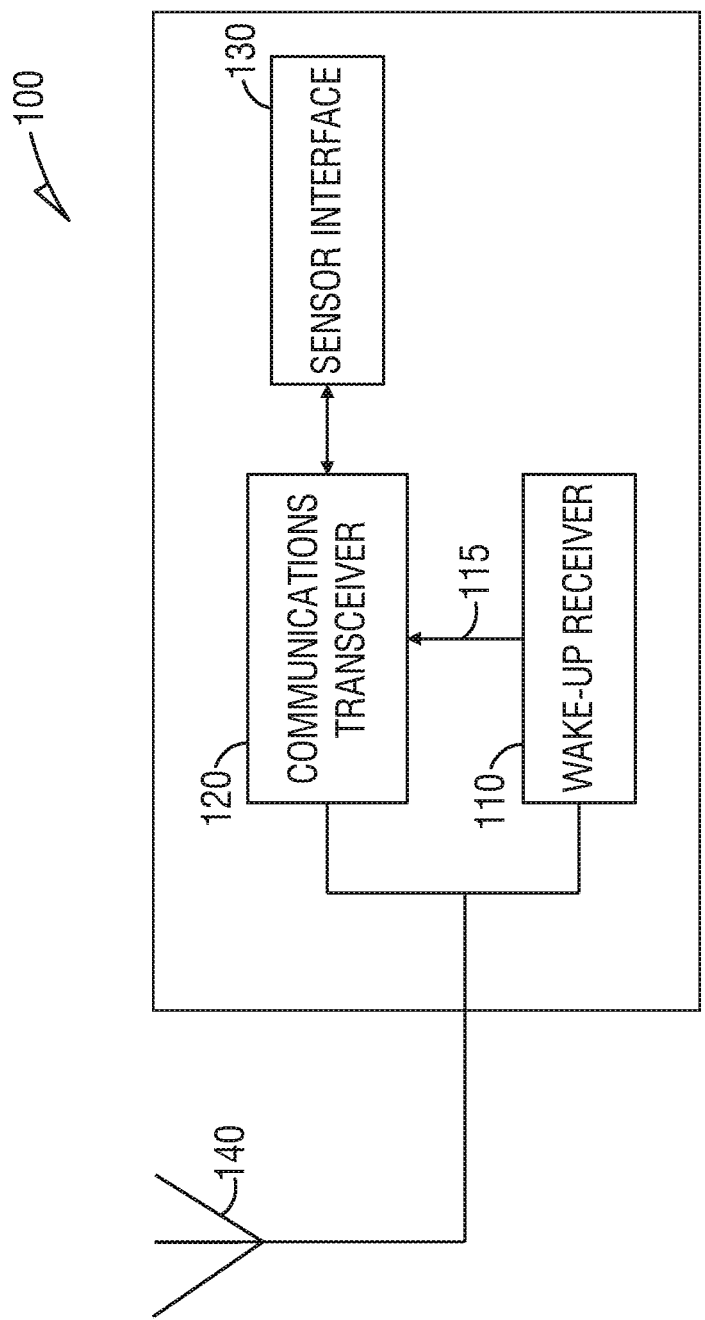
FIG. 1 shows an example wireless communications device in accordance with an aspect of the disclosure.

FIG. 1 shows an example wireless communications device 100. The wireless communications device 100 includes a wake-up receiver 110 and a communications transceiver 120, both of which are coupled to an antenna 140 for receiving RF signals (although in an alternative they have each be coupled to their own dedicated antennas). In this example, the wireless communication device 100 is a sensor node and therefore has a sensor interface 130, but it may alternatively serve any purpose for which communications to and from the communications transceiver 120 via the antenna 140 are required.

The wireless communications device 100 is configured such that the communications transceiver 120 is normally in a sleep or dormant mode in order to save power consumption. The wake-up receiver 110 is configured to remain on and monitor for wake-up signals received via the antenna 140 at any one or more predefined wake-up channel frequencies. For example, if the wireless communications device 110 is configured to operate using the Bluetooth Low Energy (BLE) technology, the wake-up receiver 110 may be configured to monitor for communications on any one or more of the plurality of advertising channels, which for BLE are currently at 2402 MHz, 2426 MHz and 2480 MHz. The wake-up receiver 110 is configured to recover from RF signals at any of the monitored frequencies a digital code. The wake-up receiver 110 is provisioned in advance with one or more wake-up codes (for example, stored in memory within the wake-up receiver 110, or in memory that is accessible to the wake-up receiver 110) and if a recovered digital code matches any of the one or more wake-up codes, the wake-up receiver 110 may output a wake-up signal 115 to the communications transceiver 120. By asserting the wake-up signal 115, the wake-up receiver 110 causes the communications transceiver 120 to wake-up and establish, using the antenna 140, a two-way communication with whichever external entity issued the advertising signal on one or more of the advertising channels. In this way, the wireless communications device 100 may minimise the time for which the communications transceiver 120 is operating, which significantly reduces power consumption since it is a relatively power hungry unit, whilst still quickly responding to requests to establish a data connection with the wireless communications device 100. Thus, latency (which in this disclosure is the time taken to establish a data connection with an external entity after the external entity issues an advertising signal requesting to establish a data connection) may be reduced whilst still minimising power consumption. Optionally, the wireless communications device 100 may further be configured to duty cycle the wake-up receiver 110 between an on and off state in order to save even further power at a modest increase in latency, resulting in a system that has significantly lower power and lower latency than prior art superheterodyne receivers.

The wireless communications device 100 may be configured to utilise any suitable RF communications technology. BLE may be a particularly desirable technology for some types of wireless communications device 100 because of its low power consumption. However, designing a wake-up receiver 110 that can receive and recover digital codes from advertising signals issued using BLE advertising channels, and has a sufficiently low power consumption to operate for a significant amount of time (thereby minimising device latency), is very challenging. Details of the wake-up receiver 110 design devised by the inventors that achieves a very low power consumption, and is therefore particularly useful for BLE applications, is described below.

However, it should be appreciated that the RF receiver circuit devised for the wake-up receiver 110 may be useful not only for BLE technology, but for receiving any form of RF signal, such as the wireless standards ANT, Bluetooth (BT) Classic, or IEE 802.15.4, by way of non-limiting example. In addition to supporting FSK/GFSK modulation, the wake-up receiver may be modified to support any other form of Wireless Modulation such as OOK, MSK, PSK, OQPSK, QAM and OFDM. Furthermore, its use is not limited only to wake-up receivers but may be used as an RF receiver for any other purpose.

Figure 2:
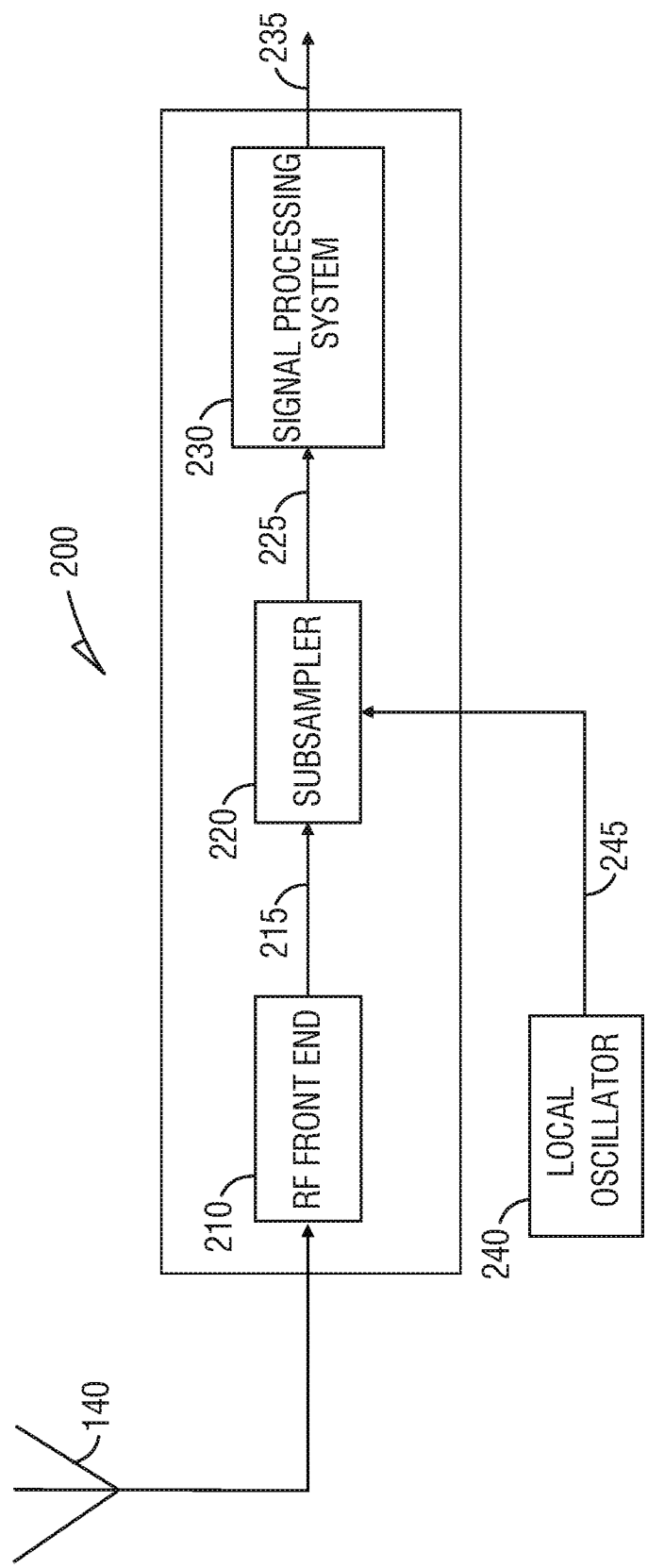
FIG. 2 shows details of an RF receiver circuit that may be used as part of the wireless communications device of FIG. 1.

FIG. 2 shows details of an RF receiver circuit 200 that may be used for the wake-up receiver 110, The RF receiver circuit 200 comprises an optional RF front end 210, a sub-sampler 220 and a signal processing system 230. The RF front end 210 is configured for coupling to an antenna 140 in order to receive RF signals. The RF front end 210 is configured to output to the sub-sampler 220 an RF signal 215 at any of a plurality of RF frequencies that the RF receiver circuit 200 is configured to monitor. For example, if the RF receiver circuit 200 is configured to monitor all of the BLE advertising channels, the RF front end 210 will be configured to pass through to the sub-sampler 220 an RF signal 215 that has been received via the antenna 140 at any of BLE advertising frequencies (currently 2402 MHz, 2426 MHz and 2480 MHz). The sub-sampler 220 receives the RF signal 215 and also receives from a local oscillator 240 a first oscillating signal 245 having a first oscillator frequency. The local oscillator 240 may be, for example, a quartz oscillator or any other suitable form of oscillator circuit such as an RC or LC oscillator, for example a high Q LC tank oscillator. It may be separate from the RF receiver circuit 200 (as shown in FIG. 2), for example it may be an oscillator that is part of the device in which the RF receiver circuit 200 is used (for example, it may be part of the wireless communications device 100) or in an alternative it may be part of the RF receiver circuit 200.

The sub-sampler 220 is configured to sub-sample, using the first oscillating signal 245, the received RF signal 215 to generate and output a sub-sampled signal 225. As described below, the first oscillating frequency may be chosen such that when the RF signal 215 is at any of the frequencies the RF receiver circuit 200 is configured to monitor, the sub-sampled signal 225 is at any of one or more desired intermediate frequencies.

The signal processing system 230 is configured to receive the sub-sampled signal 225 from the output of the sub-sampler 220, demodulate the sub-sampled signal 225 and recover from the demodulated signal a digital code that is encoded within the RF signal 215. The output 235 of the signal processing system 230 may comprise the digital code and/or any other suitable signals, such as a wake-up signal in the case that the RF receiver circuit 200 is configured to operate as the wake-up receiver 110.

Figure 3:
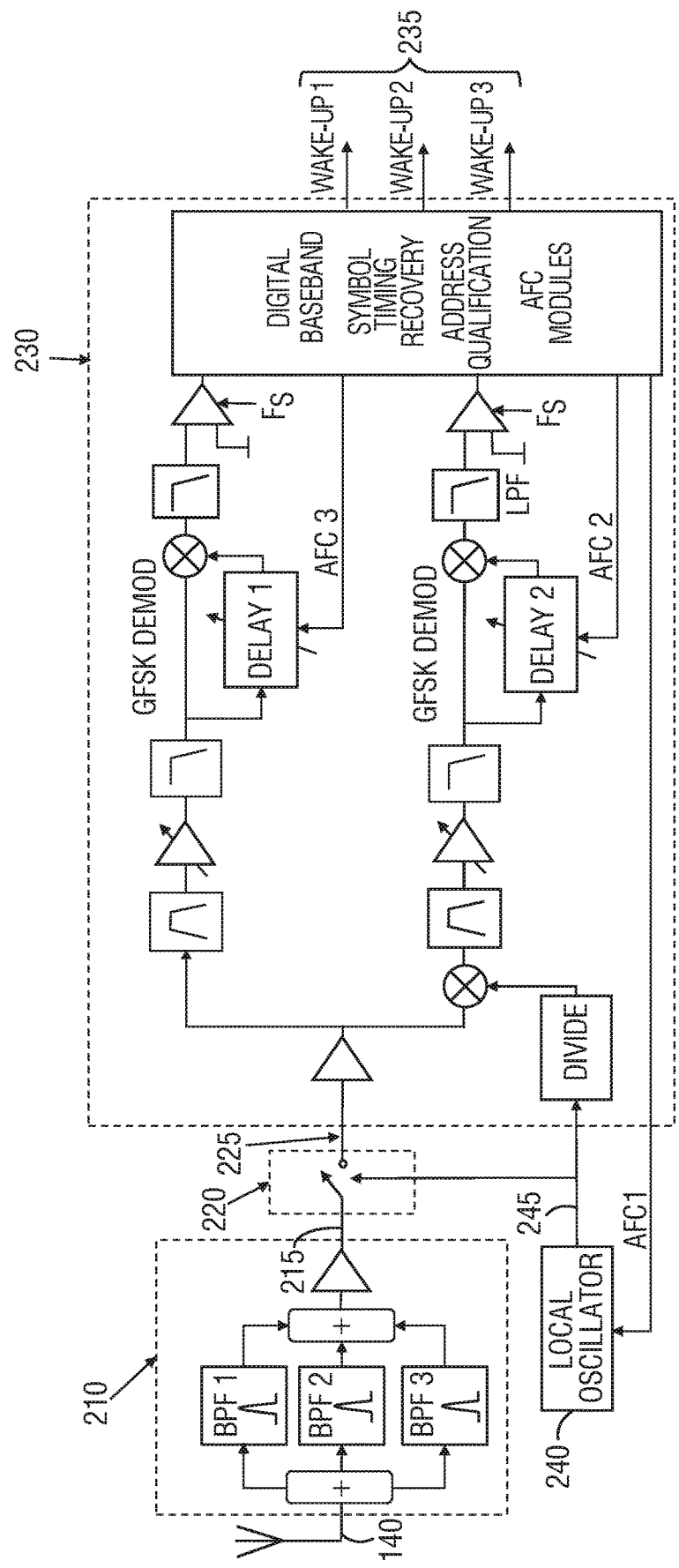
FIG. 3 shows a schematic representation of an example implementation of the RF receiver circuit of FIG. 2.

FIG. 3 shows an overall schematic representation of an example implementation of the RF receiver circuit 200. Each of the different building blocks or modules of the RF receiver circuit 200 are described below with reference to FIGS. 4A to 10.

Figure 4B:
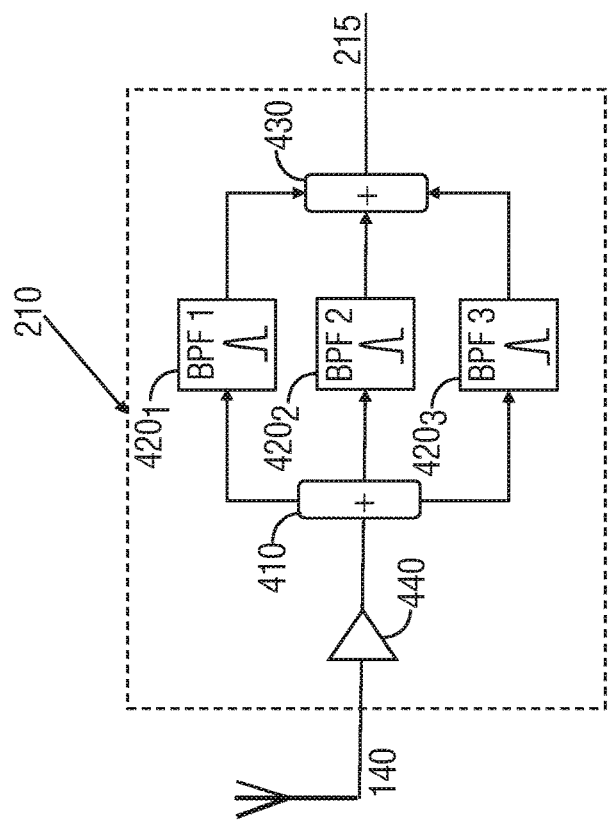
FIG. 4B shows a schematic representation of a second example of the RF front end of the RF receiver circuit of FIG. 3.
Figure 4A:
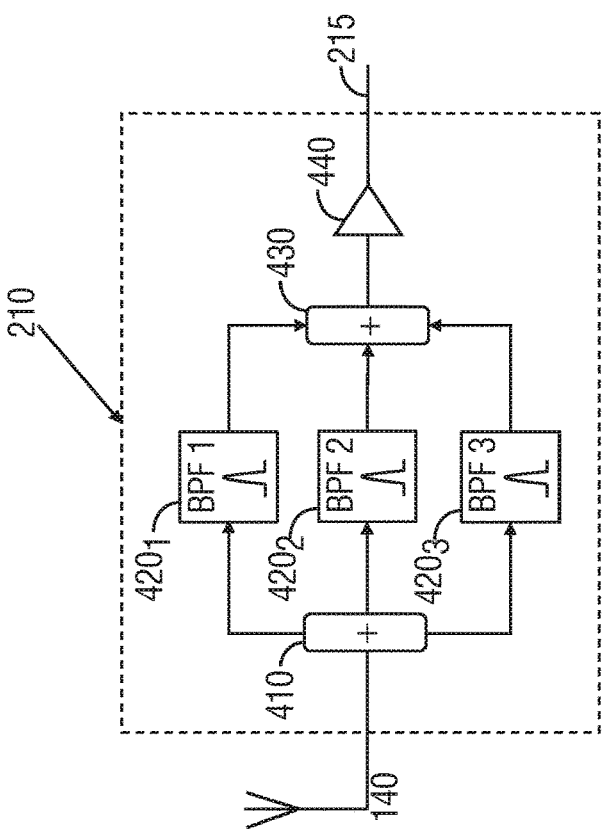
FIG. 4A shows a schematic representation of a first example of the RF front end of the RF receiver circuit of FIG. 3.

FIGS. 4A and 4B show details of example implementations of the RF front end 210. The RF front end 210 may include an RF power combiner 410 and a plurality of filters, in this example three filters $420_1$-$420_3$. The RF power combiner 410 may optionally employ matching networks and/or a Wilkinson Power divider (not shown). In an alternative implementation, the RF combiner 410 may be omitted and each of the filters $420_1$-$420_3$ may be coupled to their own independent antennae. In this example, the filters $420_1$-$420_3$ are band pass filters, for example high Q RF bandpass filters. The filters $420_1$-$420_3$ may provide channel filtering at RF and may most ideally have filter Qs in the range of 1500-200 (although other values of Q would still be acceptable). Any suitable design/type of RF combiner 410 and filters $420_1$-$420_3$ may be used and their details will not be described further as they are not the focus of this disclosure. There are three filters $420_1$-$420_3$ in this example as the RF receiver circuit 200 is configured to monitor three different RF frequencies (for example, the three BLE advertising channels at 2402 MHz, 2426 MHz and 2480 MHz) and each of the filters $420_1$-$420_3$ are centred on a respective one of the three different RF frequencies being monitored, such that RF signals received via the antenna 140 at any of those three frequencies should fall within the pass band frequency range of one of the filters $420_1$-$420_3$ and pass through to the output 215. Whilst three filters are shown, in an alternative there may be two, or four, or any number of filters in the RF front end 210, each configured to allow through a respective one of the plurality of RF signals that the RF receiver circuit 200 is configured to monitor, whilst attenuating/blocking signals at frequencies that are outside of the pass band frequency ranges of the filters.

The RF front end 210 also comprises an RF power combiner 430 to combine the outputs from each of the filters $420_1$-$420_3$ and an amplifier 440, such as a low noise amplifier (LNA) 440. The RF power combiner 430 and the amplifier 440 may be of any suitable design/type. In the arrangement of FIG. 4A, the amplifier 440 is last in the signal chain within the RF front end 210, whereas in the arrangement of FIG. 4B it is first. The RF front end 210 may be implemented in either way, however positioning the amplifier 440 upstream of the filters $420_1$-$420_3$ (as in FIG. 4B) may offer improved receiver sensitivity performance by band-limiting noise at the sub-sampler 220 input and also by mitigating the impact of insertion loss of the filters $420_1$-$420_3$. Alternatively, the configuration shown in FIG. 4A may allow the linearity and gain compression requirements of the LNA to be relaxed by allowing the $420_1$-$420_3$ to attenuate high power RF interferers and RF blockers at the input to the RF receiver circuit 200.

In a further alternative, the amplifier 440 may be omitted from the RF front end 210 entirely, which may degrade the sensitivity of the RF receiver circuit 200 to some extent but may also help to significantly reduce power consumption. Therefore, omitting the amplifier 440 may be desirable for applications where minimising power consumption is a priority.

Whilst the RF front end 210 shows a particular arrangement of matching network 410, filters $420_1$-$420_3$ and power combiner 430, this is merely one example configuration and any suitable combination of components and circuits may be used in the RF front end 210 such that the frequency of the RF signal 215 is at any one of the plurality of frequencies the RF receiver circuit 200 is configured to monitor. Furthermore, as mentioned earlier the RF front end 210 is optional and may be omitted entirely, for example with the input to the sub-sampler 220 being coupled directly to the antenna 140. The remaining components of the RF receiver circuit 200 would still operate as described below, although including the RF front end 210 may help to improve the receiver's interference rejection performance.

The sub-sampler 220 may be any suitable type of sub-sampler that is configured to sub-sample the RF signal 215 down to a lower frequency signal using the first oscillating signal 245. The frequency of the first oscillating signal 245 may be set such that for each of the plurality of frequencies the RF receiver circuit 200 is configured to monitor, the sub-sampled signal 225 should be at a predetermined intermediate frequency, IF, that at least part of the signal processing system 230 is configured to operate at.

For example, if the RF receiver circuit 200 is configured to operate according to BLE technology and monitor the three advertising channels at 2402 MHz, 2426 MHz and 2480 MHz, the first oscillating signal 245 may be set to a frequency of 24 MHz such that the following results are achieved:

| First Oscillating signal frequency | RF Signal frequency | Integer K | Predetermined intermediate frequency |
|---|---|---|---|
| 24.000000 MHz | 2.4020 GHz | 200 | 2.0000 MHz |
| 24.000000 MHz | 2.4260 GHz | 202 | 2.0000 MHz |
| 24.000000 MHz | 2.4800 GHz | 206 | 8.0000 MHz |

The integer K is the rounded down integer ratio of the RF signal frequency and half the first oscillating signal frequency, i.e.:

$$\text{Integer } K = \text{floor}\left[\frac{R_f}{\left(\frac{F_s}{2}\right)}\right]$$

Where:
$R_F$=the frequency of the RF signal 215
$F_s$=the frequency of the first oscillating signal 245.
The predetermined intermediate frequency, IF, may then be found from the following:

$$IF = F_S - rem\left[\frac{R_F}{F_S}\right] \text{ when } K \text{ is odd}$$

$$IF = rem\left[\frac{R_F}{F_S}\right] \text{ when } K \text{ is even}$$

Therefore, it can be seen that in this example by choosing $F_S$ to be 24 MHz in consideration of the three frequencies the RF receiver circuit 200 is configured to monitor, we arrive at the same first intermediate frequency (2 MHz) output from the sub-sampler 220 for two of the frequencies being monitored and a second intermediate frequency (8 MHz) output from the sub-sampler 220 for one of the frequencies being monitored. As explained later, due to imperfections in actual implemented circuits (for example, inaccuracies in the exact frequency of the first oscillating signal 245 output from the local oscillator 240, noise in the system signals, system drift causing changes in frequency over time, inaccuracies in the exact frequency of the RF signal 215 received by the sub-sampler 220, etc), the actual frequency of the sub-sampled signal 225 may not be at exactly the predetermined first or second IF. However, it should be at or close to the first or second IF within normal system operational tolerances, and an automatic frequency correction, AFC, scheme is described later for correcting and/or compensating for deviations or inaccuracies.

By achieving the same first predetermined IF for two of the frequencies being monitored, the same demodulation path may be used in the signal processing system 230 to demodulate RF signals received at either 2402 MHz or 2426 MHz, as described later. This reduces overall system power consumption compared with a requiring a separate demodulation path for each frequency. A separate demodulation path may be required to demodulate RF signals received at 2480 MHz, as described later. However, it can be seen that in this example, $F_s$ has been chosen such that the second predetermined IF is a multiple of the first predetermined IF, which can help to simplify the signal processing system 230, as described later.

FIG. 5A shows a particular circuit design for the sub-sampler 220, developed by the inventors. Whilst any type of known sub-sampler circuit may alternatively be used, the circuit represented in FIG. 5 may be particularly beneficial as it is designed to present a constant load impedance at its input.

In this circuit design, the sub-sampler 220 comprises a switching circuit 510 configured to receive the RF signal 215 and output the sub-sampled signal 225, and a switching control circuit 520 configured to control the timing of the switching circuit 510 using the first oscillator signal 245, such that the RF signal 215 is sampled by the switching circuit 510 and the sub-sampler 220 presents a substantially constant impedance at its input. The switching circuit 510 comprises a first sampling path made up of switches $M_1$, $M_2$ and a first sampling device $C_1$ (which in this example is a capacitor, but it may be any suitable component for sampling a signal), and a second sampling path made up of switches $M_3$, $M_4$ and a second sampling device $C_2$ (which in this example is a capacitor, but it may be any suitable component for sampling a signal). The switch control circuit controls the state of each of the switches $M_1$-$M_4$ using the control signals A-D.

FIG. 5B shows an example timing diagram to visualise control of the switching circuit 510, As shown, the switch control circuit 520 uses the first oscillating signal 245 to control the timing of the signals A-D. The switching circuit 510 is configured to alternative between two operating states, controlled by the switching control circuit 520. The switching control circuit 520 sets the switching circuit 510 to a first state by turning on switch $M_1$ using signal A and turning off switch $M_3$ using signal C (which causes the value of the RF signal 215 at the time of the switching to be sampled by the second sampling device $C_2$), such that the first sampling device $C_1$ is presented at the input of the sub-sampler 220 so that the RF signal 215 is applied to the first sampling device $C_1$. This can be seen in FIG. 5B by virtue of the signal $V_1$ being the same as the RF signal 215 during this state. Furthermore, the switching control circuit 520 turns off switch $M_2$ using signal B and turns on switch $M_4$ using signal D so that the second sampling device $C_2$ is presented at the output of the sub-sampler 220 so that a preceding sample is output from the second sampling device $C_2$ as the sub-sampled signal 225. This can be seen in FIG. 5B by virtue of the signal $V_2$ being static and the sub-sampled output signal 225 being the same as the signal $V_2$ during this state, The switch control circuit 520 sets the switching circuit 510 to the first state for a first amount of time (in this example one period of the first oscillating signal 245, although it may alternatively be for any amount of time controlled by the first oscillating signal 245, for example two periods of the first oscillating signal 245 if it is desired to sub-sample at half the frequency of the first oscillating signal 245, etc).

At the end of the first amount of time, the switch control circuit 520 sets the switching circuit 520 to the second state by turning off switch $M_1$ using signal A (which causes the value of the RF signal 215 at the time of the switching to be sampled by the first sampling device $C_1$) and turning on switch $M_3$ using signal C, such that the second sampling device $C_2$ is presented at the input of the sub-sampler 220 so that the RF signal 215 is applied to the second sampling device $C_2$. This can be seen in FIG. 5B by virtue of the signal $V_2$ being the same as the RF signal 215 during this state. Furthermore, the switching control circuit 520 turns on switch $M_2$ using signal B and turns off switch $M_4$ using signal D so that the first sampling device $C_1$ is presented at the output of the sub-sampler 220 so that a preceding sample is output from the first sampling device $C_1$ as the sub-sampled signal 225. This can be seen in FIG. 5B by virtue of the signal $V_1$ being static and the sub-sampled output signal 225 being the same as the signal $V_2$.

The switch control circuit 520 sets the switching circuit 510 to the second state for a second amount of time, which is of equal duration to the first amount of time. At the end of the first amount of time, the switch control circuit 520 then returns the switching circuit 510 back to the first state, so that the switching circuit 510 alternates between the first and second state.

If the first and second sampling devices are chosen to have the same impedance (for example, they are two matched capacitors), it can be seen that load impedance presented at the input to the sub-sampler 220 remains constant.

FIG. 5A also shows an optional input capacitor $C_I$ for DC blocking and an optional bias voltage $V_{Bias}$ and resistor $R_I$ for biasing the input voltage. It will be appreciated that the fundamental operation of the sub-sampler 220 described above is not reliant on these features and so they may be omitted if desired. Further represented in FIG. 5A is holding capacitor CL configured to acquire and hold the charge that is transferred from the sampling device $C_1$ when the switch $M_2$ is turned on and to acquire and hold the charge that is transferred from the sampling device $C_2$ when the switch $M_4$ is turned on, in accordance with the control process described below. To reduce/minimise signal loss, the capacitance of $C_L$ may be set to be much smaller than the capacitance of $C_1$ and $C_2$, for example 10 times smaller.

The switch control circuit 520 may be implemented to operate in the way described above using any suitable device and/or circuit. For example, it may be implemented by any form of logic, such as a microcontroller, etc, which may be a part of a larger, multi-function logic unit, or may be a dedicated logic unit only for this purpose. The switch control circuit 520 may be configured to bootstrap the switches $M_1$-$M_4$ in order to reduce the on-resistance of the switches, thereby increasing the signal tracking bandwidth of the sub-sampler 220. Optionally in this case, the switch control circuit 520 may be configured to receive from some other device, or at the time of circuit set-up/calibration, a signal setting the bootstrap voltage level.

Whilst FIG. 5A shows each of the switches $M_1$-$M_4$ as FETs, it will be appreciated that any type of controllable switch may alternatively be used, the nature/type of the control signals A-D set accordingly in order to achieve the control described above.

Whilst FIG. 5B shows switches $M_1$-$M_4$ all switching at the same moment in time, in an alternative the switching control circuit 520 may be configured to stagger the switching slightly in time so that at any moment in time not all of the switches $M_1$-$M_4$ are changing state. The switches may be driven using a Break-Before-Make (BBM) timing such that switches M1 and M4 are turned off slightly before switches M2 and M3 are turned on (for example, about 1 ns before, or less than 1-2% of the clock period). Likewise, switches M2 and M3 may then be turned off just before (for example, 1 ns before) switches M1 and M4 are turned on. This timing may be achieved using a non-overlapping clock phase generator in the switch control circuit 520. By using non-overlapping (BBM) timing, charge transfer may be maximised and signal losses in the sub-sampler 220 may be minimised.

Where the first and second sampling devices $C_1$ and $C_2$ are capacitors, they may be set to be relatively large values in order to reduce KT/C noise and power consumption of the sub-sampler 220, for example they may be in the order of 0.1 pF. Furthermore, where an output capacitor $C_L$ is used, it may be chosen to be significantly smaller (for example, by orders of magnitude) than the capacitance of the first and second sampling devices $C_1$ and $C_2$ such that $C_1$ and $C_2$ set the KT/C noise of the sub-sampler 220. Each of the devices $C_1$, $C_2$ and $C_L$ may have their second terminals (i.e., their terminals that are not coupled to $V_1$, $V_2$ or the sub-sampler 220 output) coupled to a reference voltage such as ground or some other suitable potential.

Figure 6:
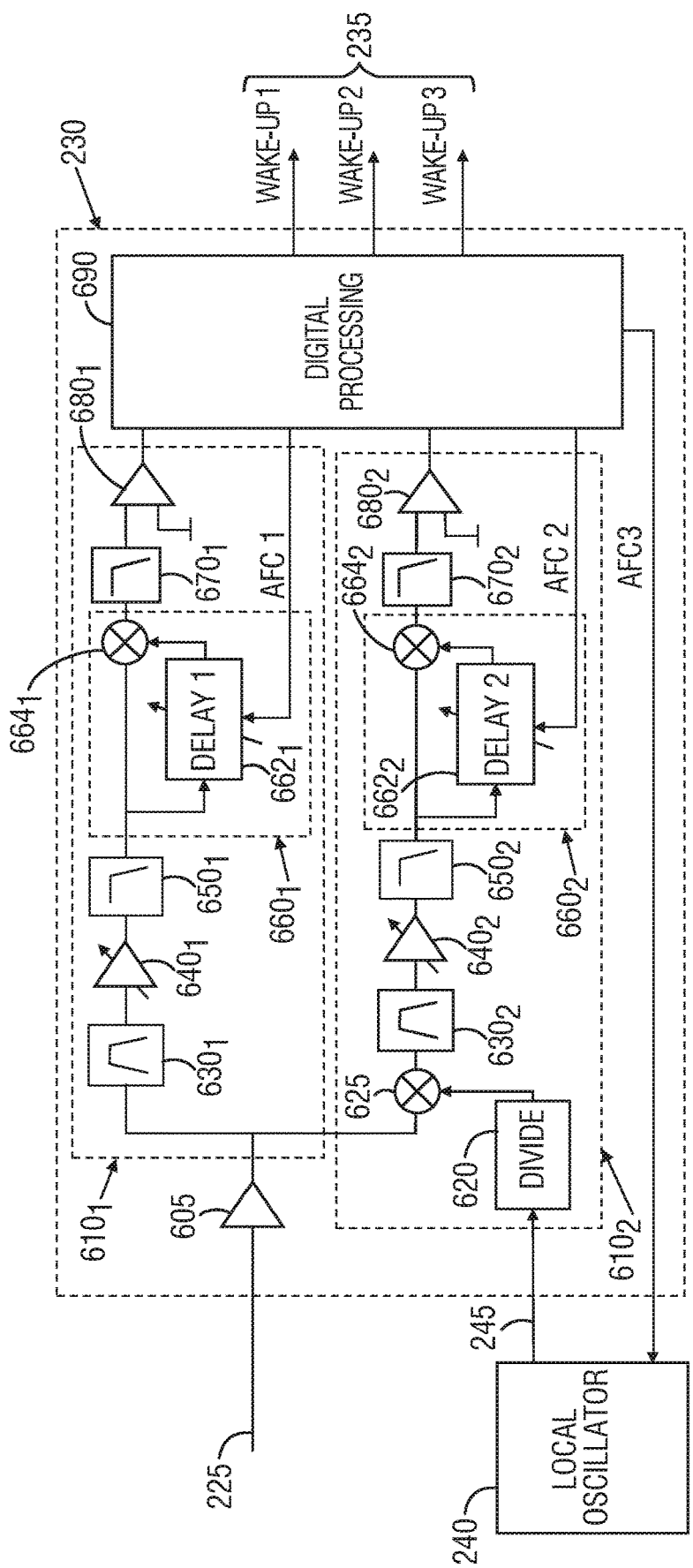
FIG. 6 shows a schematic representation of an example implementation of the signal processing system of the RF receiver circuit of FIG. 3.

FIG. 6 shows details of an example implementation of the signal processing system 230. The signal processing system 230 includes a buffer/amplifier 605 through which the sub-sampled signal 225 received from the sub-sampler 220 passes. However, this optional component of the system 230 may be omitted, for example if the sub-sampled signal 225 is sufficiently large not to require amplification at this stage.

The signal processing system 230 also includes a first demodulation path $610_1$ and a second demodulation path $610_2$. The first demodulation path $610_1$ and second demodulation path $610_2$ are very similar in design and operation, so details of the first demodulation path $610_1$ shall first be described and then an explanation of the ways in which the second demodulation path $610_2$ is different shall be explained.

The first demodulation path $610_1$ includes a first band pass filter $630_1$, which is centred on the first IF, described earlier. The purpose of the first band pass filter $630_1$ is to attenuate DC and to allow through the sub-sampled signal 225 when it is at or close to (i.e., within the pass band range of frequencies of the filter $630_1$) the first intermediate frequency and attenuate/block signals at other frequencies. It will be appreciated that the first band pass filter $630_1$ is optional and may be omitted, for example if all of the plurality of frequencies the RF receiver circuit 220 is configured to monitor will result in a sub-sampled signal 225 that is at the first intermediate frequency, such that the sub-sampler 220 will not output to the signal processing system 230 signals at a substantially different frequency to the first IF and therefore will not require attenuation/blocking (for example, in the BLE context described above, if the RF receiver circuit 200 is configured to monitor only the advertising frequencies 2402 MHz and 2426 MHz, such that signals at only these two frequencies will be translated/mixed by the sub-sampler 220 to the sub-sampled signal 225, in which case the sub-sampled signal 225 will always be at or around the first IF). In a further possibility, the first bandpass filter $630_1$ may be omitted even if the sub-sampled signal 225 may be at a frequency other than the first IF (for example, at the second IF) on the assumption that the first demodulator 660₁ will not intelligibly demodulate signals that have a significantly different frequency to the first IF and therefore will not do any harm to the overall operation of the signal processing system 230.

The first demodulation path 610₁ further includes a first variable amplifier 640₁, which may alternatively be a fixed gain amplifier, or may be omitted entirely if the signal passing through the first demodulation path 610₁ is sufficiently large to be demodulated by the first demodulator 660₁ without amplification. Furthermore, the first demodulation path 610₁ includes a first low pass filter 650₁ configured to allow through signals at and below the first IF and attenuate/block frequencies above the cutoff frequency of the first low pass filter 650₁, in order to reduce any high frequency noise introduced by the amplifier 640₁. Again, it will be appreciated that this is an optional component of the first demodulation path 610₁ and may alternatively be omitted, for example if the amplifier 640₁ is one that introduces very little high frequency noise, or if the amplifier 640₁ is omitted from the first demodulation path 610₁. In a further alternative, the first bandpass filter 630₁, amplifier 640₁ and low-pass filter 650₁ may be combined into one combined circuit to achieve the desired gain and filtering requirements of the first demodulation path 610₁.

The first demodulation path 610₁ further includes a first demodulator 660₁ having an operational centre frequency that is the first intermediate frequency and being configured to demodulate the sub-sampled signal 225. For example, in the BLE example described earlier, the first demodulator 660₁ may be configured to operate with a centre frequency of 2 MHz. As such, the first demodulation path 610₁ is configured to demodulate sub-sampled signals 225 that have an IF of 2 MHz, which corresponds to RF signals 215 at either of the first two advertising frequencies 2402 MHz and 2426 MHz. The first demodulator 660₁ may be a frequency shift key, FSK, type demodulator, or a Gaussian Frequency Shift Keying, GFSK, type demodulator, for example if the RF signals 215 that the RF receiver circuit 200 is configured to monitor are encoded using FSK or GFSK, as is the case with BLE. The first demodulator 660₁ comprises a first delay 662₁ and a first mixer 664₁.

Figure 7B:
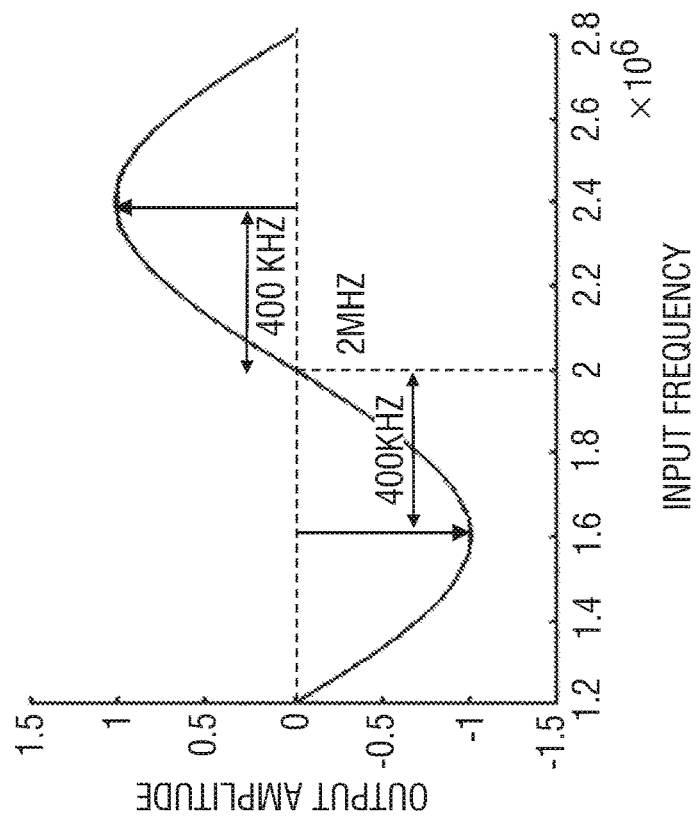
FIG. 7B shows a visualisation of the transfer function of the first demodulator of FIG. 7A.
Figure 7A:
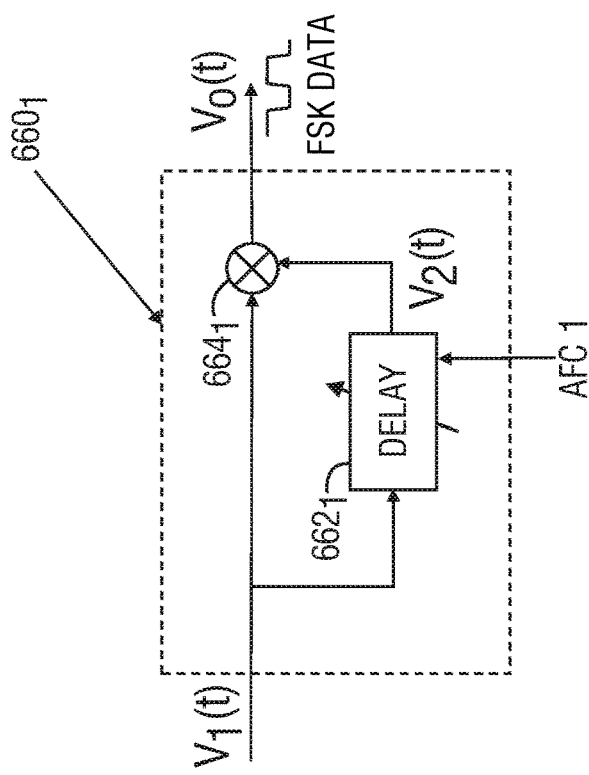
FIG. 7A shows a more detailed representation of the first demodulator of the signal processing system of FIG. 6.

FIG. 7A shows a further more detailed representation of the first demodulator 660₁ to aid in understanding its configuration and operation. V₁(t) is the sub-sampled signal 225 received by the first demodulator 660₁, V₂(t) is the delayed version of V₁(t), and V₀(t) is the output of the first demodulator 660₁ and comprises the demodulated FSK data that was encoded in the received RF signal 215. The following describe the relationship between the signals and the time delay applied by the first delay 662₁:

$V_1(t) = A \cos\{2\pi F_{in}t\}$ $V_2(t) = A \cos\{2\pi F_{in}t + 2\pi F_{in}\tau\}$ $V_0(t) = A \cos\{2\pi F_{in}t\} A \cos\{2\pi F_{in}t + 2\pi F_{in}\tau\}$ $F_{in} = IF \pm Fdev$ Where:
IF=the centre frequency of the FSK signal V₁(t), which should be at or close to the first intermediate frequency
$F_{dev}$=the FSK/GFSK peak deviation frequency
$F_{in}$=the varying frequency of the FSK signal V₁(t)
A=the peak amplitude of the sub-sampled signal V₁(t)
τ=time delay applied by delay 662₁

Using the cosine relationship $$\cos(\alpha) \cdot \cos(\beta) = \frac{1}{2}\{\cos(\alpha - \beta) + \cos(\alpha + \beta)\},$$

we can arrive at:

$$V_o(t) = \frac{A^2}{2}\cos\{2\pi F_{in}\tau\} + \frac{A^2}{2}\cos\{2\pi F_{in}t + 2\pi F_{in}\tau\}$$

Where
$\cos\{2\pi F_{in}\tau\}$ represents the wanted part of the spectrum that provides the FSK data
$\cos\{2\pi F_{in}t + 2\pi F_{in}\tau\}$ represents the unwanted component that is centred at a frequency of twice the first IF, and is removed by the post-demodulator low pass filter 670₁.

To optimise the first demodulator's frequency response, τ may be designed such that a single period of the cosine frequency response of the first demodulator 660₁ equates to a span of 4 Fdev, with the first IF located at an odd multiple of Fdev. In this way, the first demodulator's output may be maximised at FSK input frequencies IF+Fdev and IF−Fdev.

FIG. 7B shows a visualisation of the transfer function of the first demodulator 660₁, where Fdev is 400 kHz and the operational centre frequency is at the first IF 2 MHz (i.e., the operational centre frequency of the first demodulator is IF=K Fdev, where K is an odd integer, in this example K=5).

The optimum delay τ that maximises the FSK demodulator output levels is ¼ Fdev. In the example given above where Fdev is 400 kHz, this equates to a time delay of 620 ns. The first delay 662₁ may be set to apply this delay in any suitable way. In one non-limiting example, the first oscillating signal 245 may be used to set τ, where the first delay 662₁ may be configured to have a programmable delay value m, such that τ=mT_s. In the example configuration of the RF receiver circuit 200 described herein, the values have been conveniently chosen such that the first oscillating signal 245 has a frequency of 24 MHz, which equates to a period T_s of 41.67 ns, such that a delay value of m=15 results in a delay τ of about 620 ns. The skilled person will readily appreciated that there are many other ways in which the delay τ may be set.

The AFC 1 signal may be used to adjust the delay τ in order to compensate for any mismatch/difference between the operational centre frequency of the first demodulator 660₁ and the frequency of the signal demodulated by the first demodulator 660₁ (i.e., the centre frequency of the sub-sampled signal 225). For example, if the first oscillating signal 245 is used to set the delay τ, and if Fdev=Fs/4 m and if IF=K Fdev, then the operational centre frequency, IF, of the first demodulator 660₁ may be described as follows:

$$\text{Operational centre frequency} = \frac{KFs}{4m}$$

Where:
$F_s$=the frequency of the first oscillating signal 245
m=the number of clock cycles of oscillator signal 245 used to represent delay τ
In the example described earlier where K=5 and a delay value of m=15 results in the first demodulator 660₁ having an operational centre frequency of 2 MHz and a desirable frequency response of Fdev=400 kHz, we may actually set m=14.5+Δn, where Δn is a value between 0 to 1 and is set by AFC 1. As a result, the delay m may be controlled by AFC 1 to be anywhere between 14.5 and 15.5, thereby enabling AFC 1 to be used to achieve a degree of flexibility in the operational centre frequency of the first demodulator $660_1$. Whilst this is one particular example of controlling the time delay applied by the delay $662_1$ in order to achieve some feedback control of the operational centre frequency of the first demodulator $660_1$, it will be appreciated that the time delay may be set in any other suitable way and adjusted by AFC 1 in any other suitable way and it may have a larger control range than +/−0.5 on the delay m, such as +/−1.0 or +/−2.0, etc. The control of the signal AFC 1, and the benefits of being able to compensate in this way for mismatches in the frequency of the sub-sampled signal 225 and the centre frequency of the first demodulator $660_1$, are described in more detail later. It will be appreciated that throughout this disclosure, when the sub-sampled signal 225 encodes FSK/GFSK data, the "frequency of the sub-sampled signal 225" is the centre frequency of the FSK/GFSK sub-sampled signal, which should ideally perfectly align with the operational centre frequency of the demodulator in order to achieve perfect demodulation.

Returning to FIG. 6, the demodulated sub-sampled signal output from the first demodulator $660_1$ passes through a first low pass filter $670_1$ in order to attenuate/remove the unwanted component of the demodulated sub-sampled signal (described earlier) and leave only the wanted component that provides the demodulated FSK/GFSK data. It may also remove excess noise from the demodulated GFSK data stream at the output of the first demodulator $660_1$. The bandwidth of the first low pass filter $670_1$ may, for example, be approximately equal to 0.8 times the FSK/GFSK data date. The cutoff frequency of the low pass filter $670_1$ may be set at any suitable frequency in consideration of the frequency of signals that should be allowed to pass through and signals that should be blocked/attenuated. In an alternative, the first low pass filter $670_1$ may effectively be embedded within the first modulator $660_1$.

Finally, the first comparator $680_1$ may convert the analog signal output by the first low pass filter $670_1$ to a 1 bit digital signal (i.e., the first comparator $680_1$ may operate as a 1-bit ADC) from which the digital code that is encoded in the RF signal 215 is recovered. One input to the comparator $680_1$ is the demodulated analog signal and the other input is set to any suitable reference voltage in order to perform the conversion. As a result, the signal output from the first comparator $680_1$ is a digital signal that contains the digital code of the RF signal 215. In the BLE example disclosed herein, the RF signal 215 may be either channel 2402 MHz or 2426 MHz, such that the RF receiver circuit 200 can monitor two different channel frequencies and use the same single sub-sampler 220 and demodulation path to recover a digital code that is encoded within the RF signal at either frequency. This significantly reduces complexity, cost and power consumption of the RF receiver circuit 200 compared with traditional approaches that would typically require a separate RF receiver circuit 200 for each RF signal frequency to be monitored, each with their own demodulation circuitry and high power superhet circuitry tuned to the frequency being monitored.

The second demodulation path $610_2$ is very similar to the first demodulation path $610_1$, but includes two additional components, a divider unit 620 and a mixer 625. In this example implementation, the second demodulation path $610_2$ is configured to demodulate the sub-sampled signal 225 that is at the second IF. In particular, in the BLE example described earlier, there is one advertising frequency, 2.4800 GHz, that results in the sub-sampled signal 225 being at the second intermediate frequency 8 MHz. Therefore, in this example, the second demodulation path $610_2$ is configured to demodulate the sub-sampled signal when it is at the second IF, so that the digital code encoded in an RF signal 215 at the advertising frequency 2.4800 GHz can be recovered by the digital processing unit 690. The mixer 625 is configured to modify the frequency of the sub-sampled signal 225 such that when the frequency of the sub-sampled signal 225 is the second IF (in this example, 8 MHz), the output of the mixer comprises a signal having a third intermediate frequency. The second demodulator $660_2$ is then configured to have an operational centre frequency that is the third intermediate frequency, such that it demodulates the sub-sampled signal at the third intermediate frequency. The second demodulator $660_2$ is configured to operate in this way by setting an appropriate time delay for the second delay $662_2$, analogously to the earlier explanation in relation to the first demodulator $660_1$. It will be appreciated that if the second demodulation path $610_2$ includes any of the optional filters and amplifiers $630_2$, $640_2$, $650_2$, $670_2$, they will be configured to operate at appropriate frequencies in view of the third IF.

In one particular implementation, the third IF may be the same as the first IF, which in the example above is 2 MHz. This may be particularly beneficial for simplicity of system design, but also because in the BLE example above demodulating a sub-sampled signal at 2 MHz has been found to be more efficient in terms of power consumption than demodulating at higher frequencies. It will be understood that the operation of the mixer 625 results in the output of two signals—the sum and the difference of the two input signals. Therefore, in this example, where the mixer 625 is configured to output a signal at 2 MHz when it receives a sub-sampled signal 225 at 8 MHz, the mixer 625 may receive a second input signal from the divider 620 having a frequency of 6 MHz. As a result, when the sub-sampled signal 225 is at 8 MHz, the mixer 625 will output two signals, one at 2 MHz and one at 14 MHz. The filters $630_2$ and/or $650_2$ may then attenuate/block the higher frequency signal. In this particular example, because the frequency of the first oscillating signal 245 is 24 MHz, it is a convenient multiple (×4) of the required frequency of the second input to the mixer 625, so a divider 620 may be used to obtain the second input to the mixer 625 by dividing the frequency of the first oscillating signal 245 by four. This is particularly beneficial from a complexity, cost and power consumption perspective since then a separate oscillator circuit is not required. However, it will be appreciated that the second input signal to the mixer 625 may be generated in any other suitable way, including by a further dedicated oscillator.

In an alternative implementation of the second demodulation path $610_2$, the divider 620 and mixer 625 may be omitted entirely and the second demodulator $660_2$ configured to have an operational centre frequency at the second IF. In some circumstances this may be beneficial, since fewer components may be required, particularly if the second input to the mixer 625 cannot easily be derived from the first oscillating signal 245. However, it may result in higher power consumption if the second IF is higher than the first IF, since demodulating at higher frequencies tends to be less power efficient.

The rest of the second demodulation path $610_2$ operates as described above in respect of the first demodulation path $610_1$ such that when the received RF signal 215 is at the RF frequency the second demodulation path $610_2$ is configured to be used for (in the BLE example described above, 2,4800 GHz), the output of the second demodulation path $610_2$ will contain the recovered digital code that was encoded in the RF signal 215 (for example, it may be a 1-bit digital signal that contains the digital code).

Consequently, it can be seen that in this example, the RF receiver circuit 200 is configured to monitor a plurality of different RF frequencies simultaneously, such that if an RF signal is received on any of those RF frequencies the digital code encoded in the RF signal can be recovered. This is achieved at relatively low power compared with previous receiver circuits since only a single sub-sampler is required and the first demodulation path $610_1$ may be used to recover the digital code from RF signals at two of the RF frequencies being monitored. In particular, the RF receiver circuit 200 disclosed herein may reduce the power consumption by a factor of about 50-100 times compared with prior art receivers fabricated using current IC fabrication technology. For example, typical power consumption of a prior art receiver is currently about 5-10 mW, with more than 60% of the power consumption being associated with the RF local oscillator synthesizer and local oscillator path, which are required for superheterodyning. The RF receiver circuit 200 fabricated using the same IC fabrication technology may achieve a power consumption of below 250 µW, or below 200 µW, or below 150 µW, such as around 100 µW.

Whilst in this example three different RF frequencies are monitored, it will be appreciated that the RF receiver circuit 200 may be configured to monitor any number of different frequencies, such as two, or four, or five, etc. Depending on the particular frequencies being monitored, a single demodulation path may be used to recover a digital code encoded in RF signals at two or more of those monitored frequencies (as explained above for the first demodulation path $610_1$), or in an alternative a separate demodulation path may be required for each monitored frequency (as exampled above for the second demodulation path $610_2$). Therefore, the signal processing system 230 may include one or more different demodulation paths as required depending on the frequencies to be monitored by the RF receiver circuit 200 and the resultant frequencies of the sub-sampled signal 225.

The digital processing unit 690 may be configured to perform any one or more of various different functions. As such, the digital processing unit 690 may be configured to perform the function(s) described below using circuitry and/or a processor(s) and memory comprising instructions to be executed using the processor(s).

In the example represented in FIG. 6 where the RF receiver circuit 200 operates as the wake-up receiver 110, the digital processing unit 690 may comprise a wake-up assertion unit that is configured to perform address qualification. In particular, the wake-up assertion unit may comprise memory (or have access to memory elsewhere on the device in which the RF receiver circuit 200 is used) comprising one or more predetermined wake-up codes. It may compare the digital code received from the first demodulation path $610_1$ or second demodulation path $610_2$ to the one or more predetermined wake-up codes and if the digital code matches, it may output a wake-up assertion signal. Depending on system implementation, a match may be only a perfect match, or it may be a partial match (for example, a recovered digital code that is not identical to a predetermined wake-up code but is sufficiently close to be deemed to be a match, or is deemed by to be a match in accordance with an error correction algorithm), In the example represented in FIG. 6, the wake-up assertion signal 235 comprises three different signals—wake-up 1, wake-up 2 and wake-up 3.

That is because in this example, the RF receiver circuit 200 is configured to monitor three different RF frequencies, where each monitored RF frequency has a different predetermined wake-up code associated with it. As a result, an advertising signal received by the RF receiver circuit 200 on one of those frequencies will encode a different digital code and to an advertising signal request received by the RF receiver circuit 200 on a different one of those frequencies. The signals wake-up 1, 2 and 3 each correspond to a different one of the monitored frequencies, such that receiving an advertising signal on one of those frequencies results in its corresponding wake-up assertion signal being output. Consequently, it is possible to discern from the wake-up assertion signal 235 on which frequency the advertising signal was received. Optionally, each different signal wake-up 1, 2 and 3 may be used to wake-up a different component/part of the device in which the wake-up receiver 110 is used, enabling an external entity to wake-up a particular part of the device 100 by broadcasting an advertising signal on the correct one of the plurality of available advertising frequencies. Each of the signals may be any of a static (latched) assertion signal, a pulsed form signal or a multibit signal. However, in an alternative, the wake-up receiver 110 may output only a single wake-up assertion signal regardless of the RF channel on which the RF receiver circuit 200 received the advertising signal. In a further alternative, in some architectures/technologies each different advertising channel may encode the same wake-up digital code such that there is only one predetermined wake-up code and only one wake-up assertion signal.

Implementing a wake-up receiver 200 that compares a recovered digital code to one or more predetermined wake-up codes is advantageous compared with wake-up receivers that consider other parameters such as signal strength of received RF signals, as it should output wake-up assertion signals more reliably and accurately. Previously, this has not been possible for technologies such as BLE since previous RF receiver circuits that can recover encoded digital codes have been too power consuming to meet the BLE standard. However, the RF receiver circuit 200 described above is sufficiently low power to meet the standards and therefore enables for the first time such a wake-up receiver to be used for BLE.

Figure 8:
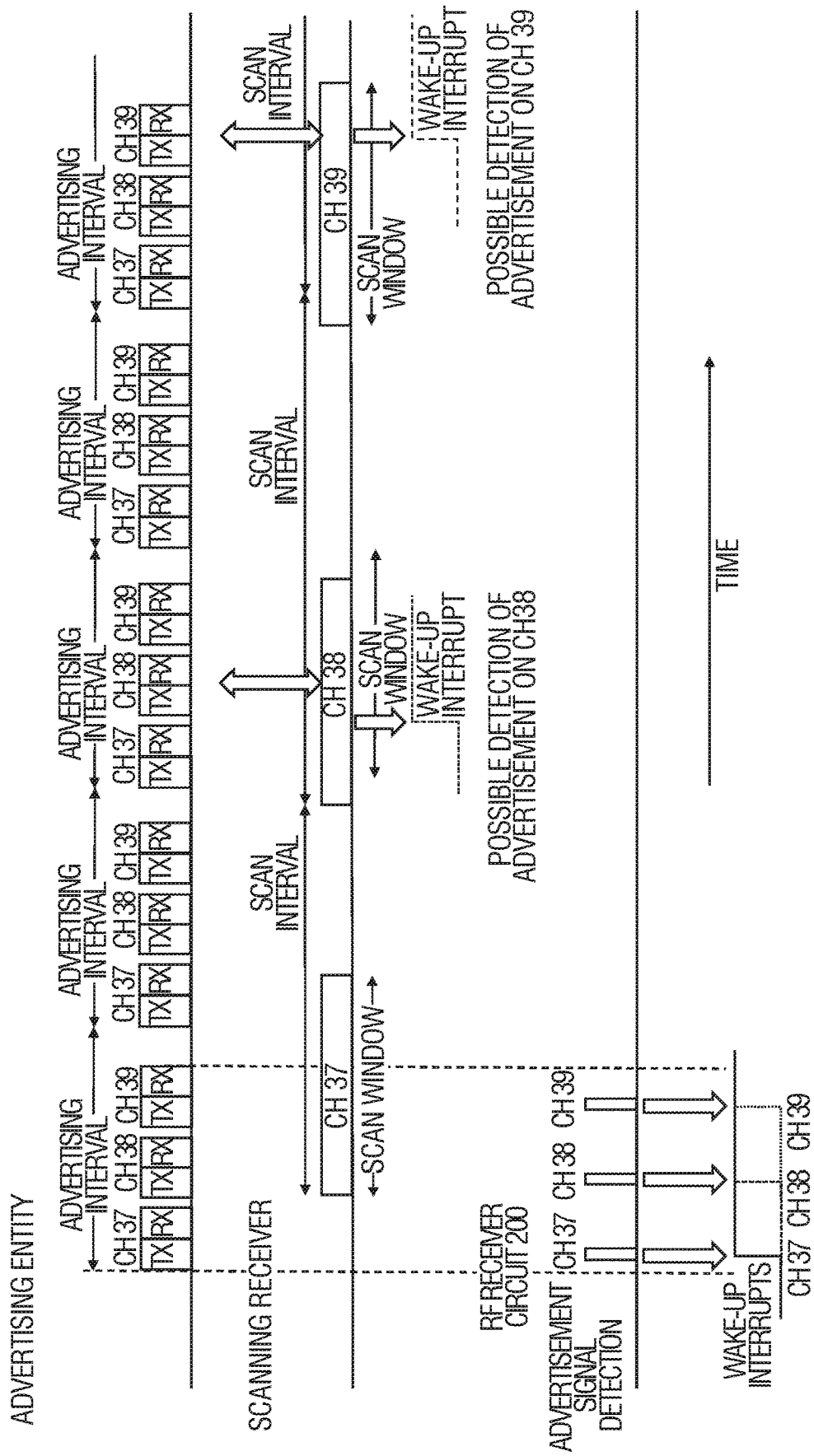
FIG. 8 shows an example representation of the response of the RF receiver circuit of FIG. 3 to advertising signals compared with the response of a prior art RF receiver circuit.

FIG. 8 shows an example representation of an entity advertising on three different advertising channels, which are referred to as Ch 37, Ch 38 and Ch 39. The RF receiver circuit 200 is configured to monitor those three channels, which in the BLE example described above would be frequencies 2402 MHz, 2426 MHz and 2480 MHz, although the RF receiver circuit 200 could alternatively be configured to operate according to any other RF technology and monitor the advertising frequencies of that RF technology. In this example, the advertising entity transmits on Ch 37, then Ch38 and then Ch 39, and periodically repeats the transmissions until a response is received.

In a traditional superhet scanning receiver, only one channel can be monitored at a time. In the example of FIG. 8, the traditional scanning receiver is configured to operate in scan intervals, where only one frequency/channel is monitored during each interval. The proportion of the scan interval for which a channel is monitored—the "scan window"—affects the power consumption of the scanning receiver, which can be quite high as superheterodyning is power intensive. Therefore, in this example the scan window is only about 50% of the scan interval. In the first scan interval, CH 37 is monitored. For the second interval, the superhet mixer frequency is changed and CH 38 is monitored. For the third scan interval, the superhet mixer frequency is changed again and CH 39 is monitored. For the next scan interval, the superhet mixer frequency is changed again and CH 37 is monitored, etc.

As can be seen, there may be significant latency in the advertising entity initiating advertising and the advertising signal being detected by the scanning receiver. In this example, transmissions during the first two advertising intervals are not detected by the scanning receiver. It is only during the third advertising interval that there is the possibility for an advertising transmission to be detected—the transmission on Ch 38. There is a further possibility of detecting an advertising transmission during the fifth advertising interval—the transmission on Ch 39. Only when an advertising transmission is detected by the scanning receiver can a wake-up assertion signal be output. Latency describes the time required to establish a data connection with a wireless communications device 100. It can be seen that in this example, if a scanning receiver is used for in the wake-up receiver 110, latency is likely to be significant as it may take multiple advertising intervals before an advertising signal is detected by the wake-up receiver 110.

In contrast, as shown in FIG. 8, the RF receiver circuit 200 described above can monitor all three channels Ch 37, Ch 38 and Ch 39 continuously and simultaneously. As a result, any of the advertising signals on those channels may be immediately detected. Therefore, if the wake-up receiver 110 uses the RF receiver circuit 200, latency may be significantly reduced. It is possible for the RF receiver circuit 200 to monitor all three channels continuously and simultaneously because of the very low power consumption that the RF receiver circuit 200 achieves, and because it does not rely on superheterodyning, which requires a change in mixer frequency to monitor each different channel.

FIG. 8 shows an example traditional scanning receiver. A further example traditional system would be one where each channel has its own superheterodyne receiver tuned to the frequency of that channel. However, if those receivers are configured to monitor their frequency all the time, the overall power consumption would be very high, which makes it impractical for many wake-up receiver applications. If the receivers are configured to monitor the frequency for very short scan windows within scan intervals, latency will again increase significantly.

FIG. 9A shows example details of an automatic frequency control, AFC, determination circuit 910$_1$ which may optionally be employed within the RF receiver circuit 200. Employing AFC may help to improve the performance of the circuit by aligning the frequency of the sub-sampled signal 225 and the operational centre frequency of the first and/or second demodulators more closely, thereby allowing the RF receiver circuit 200 to be more tolerant to the frequency accuracy range and temperature variation of the local oscillator 240 and also to be more tolerant to inaccuracies in the frequency of the RF signal that is received at the antenna 140 (for example, AFC may compensate for RF carrier frequency errors of the entity that transmits the signal, such as the advertising signal, that is received at the antenna 140. In this way, if an entity broadcasts an advertising signal at a frequency that is not exactly at one of the advertising channel frequencies, AFC may compensate for this). However, AFC may be omitted from the RF receiver circuit 200 entirely, for example if it is considered that the alignment of the frequency of the sub-sampled signal 225 and the operational centre frequency of the first and/or second demodulators will be close enough to meet the accuracy requirements of the RF receiver circuit 200.

FIG. 9A shows a first AFC determination circuit 910$_1$ that receives the digital signal from the first demodulation path 610$_1$. Typically, transmitted signals on an advertising channel include a preamble portion, most normally towards the start of the transmission. The preamble portion includes a predetermined sequence of high and low values, for example an equal number of alternating 0s and 1s. As a result, if demodulation has taken place accurately the average signal level of the preamble portion should be a predetermined level. For example, if the preamble is an equal Mark-to-Space ratio of alternating −1 and 1 symbols, the average signal level should be 0. However, if a frequency error exists, the average value will be positive or negative, depending on the sign of the frequency error.

Figure 9B:
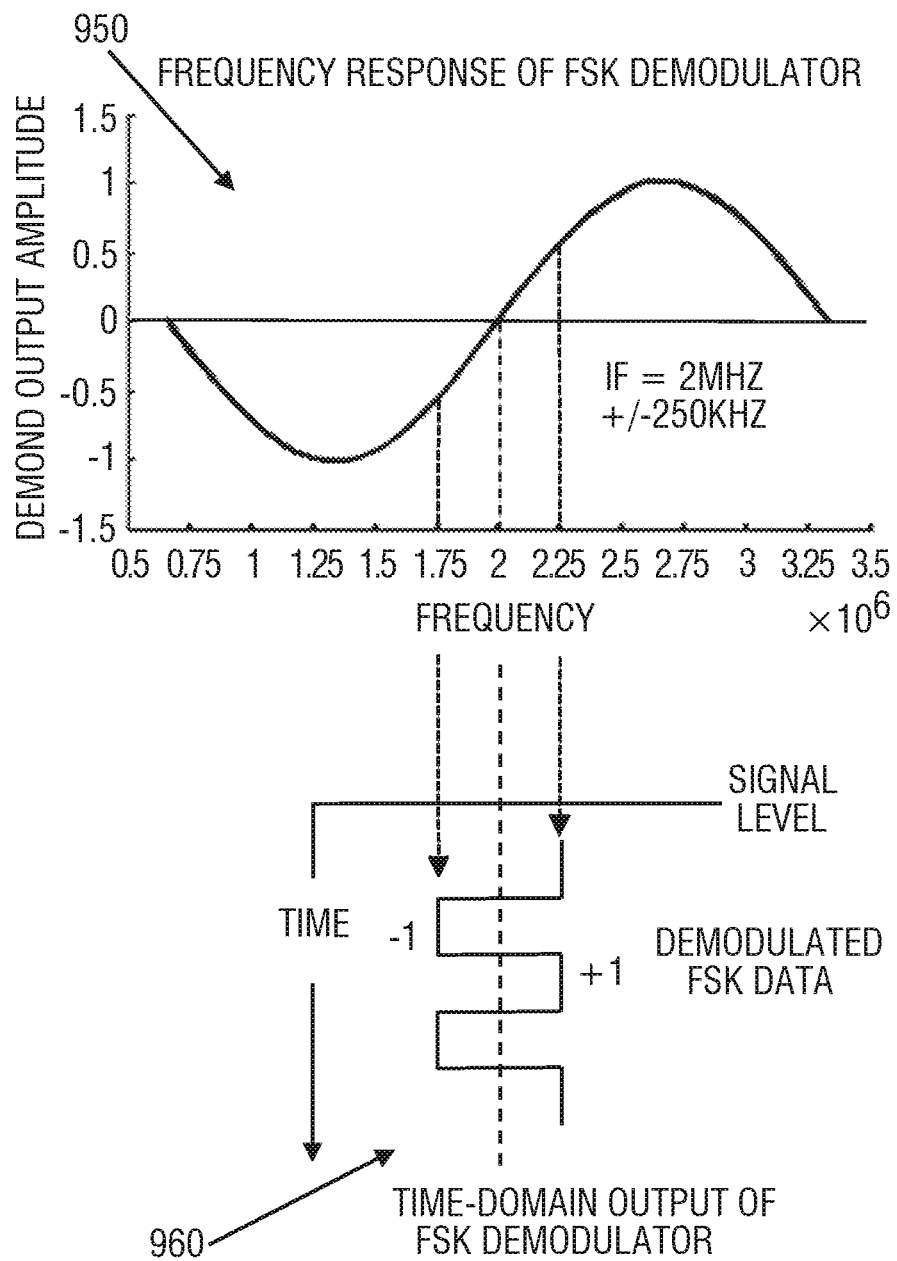
FIG. 9B shows an example representation of the frequency response of the demodulator to a preamble of an advertising signal.

FIG. 9B shows an example representation of the response of the demodulator to a preamble of an advertising signal. Graphic 950, shows the frequency response of the first and second demodulators. Graphic 960 shows the time-domain output of the first and second demodulators during the calibration portion. In this example, the preamble alternates between high and low signal levels (+1 and −1), which should result in the time-domain output of the demodulator alternating between high and low, with an average signal level of 0. In this example, the operational centre frequency of the demodulator and the frequency of the sub-sampled signal 225 are both aligned at the first IF (2 MHz in this example). However, if they are not both aligned, the average signal of the time-domain output of the demodulator may no longer be 0. For example, if the frequency of the sub-sampled signal 225 is slightly higher than 2 MHz, there is likely to be an uneven mark to space ratio of the demodulated +1 and −1 symbols at the output of the first comparator 680$_1$ and the average signal level will be greater than 0. Therefore, the first AFC unit 910$_1$ is configured to use the preamble portion of the recovered signal code to determine a difference between the frequency of the signal demodulated by the first demodulator 660$_1$ and the operational centre frequency of the first demodulator 660$_1$. The AFC unit 910$_1$ then determines a frequency error correction signal AFC 1 based on that determined difference.

To determine the difference between the frequency of signal demodulated by the first demodulator 660$_1$ and the operational centre frequency of the first demodulator 660$_1$, in this example the first AFC determination circuit 910$_1$ comprises an averaging filter 920 configured to measure the average signal level of the preamble of the digital signal. For example, it may output a measured average over many preamble symbols in order to obtain a good signal to noise ratio (eg, averaging over more symbols reduces the effect of noise and therefore improve the measured average). That measured average is then compared by a comparison unit 930 to a target reference. In the example represented in FIG. 9B, the target reference may be 0, since that is the signal level that the measured average should be if the frequency of signal demodulated by the first demodulator 660$_1$ and the operational centre frequency of the first demodulator 660$_1$ are perfectly aligned. However, for other types of preamble and/or demodulator configuration, the target reference may be different, for example if the preamble has a sequence of values that should average (if accurately demodulated) to a value of 0.5, etc. The output err(f) from the comparison unit 930 indicates the determined difference between the frequency of signal demodulated by the first demodulator $660_1$ and the operational centre frequency of the first demodulator $660_1$.

The first loop filter $940_1$ is configured to receive the determined difference, err(f), and determine a frequency error correction signal AFC 1 to compensate for the detected difference. In the particular implementation of the RF receiver circuit 220 represented in FIG. 6, it does this by controlling the time delay τ of the delay unit $662_1$. As described earlier, changing the time delay τ changes the operational centre frequency of the first demodulator $660_1$, so AFC 1 can be used to increase or decrease the time delay τ in order to move the operational centre frequency of the first demodulator $660_1$ to align more closely with the frequency of signal demodulated by the first demodulator $660_1$. In this way, any changes to, or inaccuracies in, the operational centre frequency of the first demodulator $660_1$ (for example owing to manufacturing process variations, inaccuracies in the frequency of the first oscillating signal 245, supply voltage changes/inaccuracies and/or temperature changes), and/or any inaccuracies in the RF carrier frequency (such as inaccuracies in the carrier frequency of an advertising signal broadcast from an advertising entity and received by the RF receiver circuit 200) may be compensated.

In the non-limiting example described earlier in relation to the operation of the first demodulator $660_1$, AFC 1 sets Δn to be a value between 0 to 1 in order to set the time delay τ to a value between 14.5 and 15.5 periods of the first oscillating signal 245. In the example represented in FIG. 9B, if err(f) is a positive value, the value of AFC 1 may be reduced in order to increase the operational centre frequency of the first demodulator $660_1$, thereby aligning it more closely with the frequency of signal demodulated by the first demodulator $660_1$. If err(f) is a negative value, the value of AFC 1 may be increase. It will be appreciated, however, that AFC 1 may be configured to be a value within any suitable range (i.e., not just 0 to 1). Furthermore, for alternative configurations of demodulator, AFC 1 may modify the first demodulator $660_1$ in any other suitable alternative way in order to compensate for detected differences between the frequency of signal demodulated by the first demodulator $660_1$ and the operational centre frequency of the first demodulator $660_1$.

The second loop filter $940_2$ is configured to receive the determined different, err(f) and determine a frequency error correction signal AFC 3. AFC 3 is an oscillator correction signal for use in adjusting the frequency of the a first oscillating signal 245 in such a way as to reduce any detected difference between the frequency of signal demodulated by the first demodulator $660_1$ and the operational centre frequency of the first demodulator $660_1$. As explained earlier, the frequency of the sub-sampled signal 225 is dependent on the frequency of the first oscillating signal 245. Therefore, by appropriately increasing or decreasing the frequency of the first oscillating signal 245, the frequency of the signal demodulated by the first demodulator $660_1$ and the operational centre frequency of the first demodulator $660_1$ may be more closely aligned. The way in which AFC 3 changes the frequency of the first oscillating signal 245 will depend on the type of the local oscillator 240. For example, if the local oscillator 240 is a voltage control oscillator (VCO) or a crystal oscillator, AFC 3 change the frequency of the first oscillating circuit 245 by changing bias voltages in a varactor or by switching in/switching out capacitors.

AFC 1 or AFC 2 may operate at the same time as AFC 3, such that there are two AFC loops operating at the same time on a given RF channel. Alternatively, AFC 3 may be configured to operate at different time slots than AFC 1 and AFC 2, for example operating in a time-multiplexed fashion.

Whilst FIG. 9A shows the first AFC unit $910_1$ comprising both a first loop filter $940_1$ and a second loop filter $940_2$, in an alternative it may comprise only one of the two loop filters and output only one of AFC 1 or AFC 3. In this case, AFC is still effective at improving the performance of the RF receiver 200 by aligning the frequency of signal demodulated by the first demodulator $660_1$ and the operational centre frequency of the first demodulator $660_1$ more closely. However, the implementation shown in FIG. 9A may be particularly beneficial as even greater levels of adjustment/compensation may be possible, thereby enabling an even greater degree of movement of the frequency of signal demodulated by the first demodulator $660_1$ and/or the operational centre frequency of the first demodulator $660_1$, so that they may be more closely aligned even in the most extreme cases. In this case, the RF receiver circuit 200 may be particularly tolerant to frequency errors from the local oscillator 240 and/or changes in frequency operation caused by process variation, supply voltages and/or temperature and/or any inaccuracies in the RF carrier frequency (such as inaccuracies in the carrier frequency of an advertising signal broadcast from an advertising entity and received by the RF receiver circuit 200).

Whilst not represented in the figures, it should be appreciated that in the signal processing system 230 configuration represented in FIG. 6 the digital processing unit 690 may comprise a second AFC unit $910_2$ with the same design as the first AFC unit $910_1$ but configured to receive the recovered digital code from the second demodulation path $610_2$ and output a second error correction signal comprising AFC 2 and/or AFC 3. In this way, when the RF signal 215 is at a frequency (eg, at 2.4800 GHz in the BLE example described above) such that the second demodulation path $610_2$ recovers the digital code, AFC may be used to correct/compensate for any detected difference between the frequency of signal demodulated by the second demodulator $660_2$ and the operational centre frequency of the second demodulator $660_2$. AFC 2 may operate in the same way as AFC 1 described above, but act on the second demodulator $660_2$ rather than the first demodulator $660_1$.

FIG. 10 a non-limiting example implementation of a loop filter 940, which could be used for each of the first loop filter $940_1$ and the second loop filter $940_2$. In this example, the loop filter 940 is implemented for PI control, but any other suitable control technique may be used, and any other suitable design or configuration of loop filter may be employed depending on the desired characteristics of the frequency error correction signals AFC 1, AFC 2 and/or AFC 3, and the design of the modulates those signals act on. Furthermore, there is no requirement for each different loop filter in the AFC units to have the same design and each may have a different design in order to achieve the desired operational characteristics of the frequency error correction signal they output.

The loop filter 940 comprises a multiplier 1010 that acts as an inverter to set a sign of the err(f) signal. In the example of FIG. 9B, the frequency response of the first and second demodulators is set such that the operational centre frequency (2 MHz in this example) is located on the positive gradient of the cosine function. However, the multiplier is in place so that if a demodulator had a frequency response where the operational centre frequency were located on the negative gradient, the sign of err(f) may be inverted so that negative feedback is still achieved by the AFC signal output from the AFC determination circuit. For example, the first demodulator $660_1$ may have a frequency response as shown in FIG. 9B, in which case for the loop filter(s) of the first AFC determination unit $910_1$ the value applied to the multiplier 1010 by the loop filter control and sequencer 1070 may be such that the sign of err(f) is maintained (eg, a value of +1 may be applied by the loop filter control and sequencer 1070 to the multiplier 1010). However, the second demodulator $660_2$ may have a frequency response where the operational centre frequency is on the negative slope of the cosine function. In this case, for the loop filter(s) of the second AFC determination unit $910_2$ the value applied to the multiplier 1010 by the loop filter control and sequencer 1070 may be such that the sign of err(f) is inverted (eg, a value of −1 may be applied by the loop filter control and sequencer 1070 to the multiplier 1010). In this way, the same design of loop filter 940 can be made flexible for use with different designs of demodulator, thereby simplifying the design and implementation of the AFC determination circuit 910.

The loop filter 940 may also comprise an integrator 1020, multipliers 1030 and 1040 (which set the integrator gain Ki and the proportional gain Kp respectively) and a summer 1050. Finally, the loop filter 940 may comprise a moving average filter 1060 that outputs the AFC value (eg, AFC 1, AFC 2 or AFC 3). Predetermined operational values, such as the integrator seed, the values Ki and Kp, and the averaging window/filter gain for the moving average filter 1060 may be set by the loop filter control and sequencer 1070. In this way, the operational performance of the loop filter 940 may be set/adjusted by the loop filter control and sequencer, thereby enabling optimisation of the dynamic performance of the AFC loop for a given application or use case. Consequently, the same basic loop filter 940 design may be used for the first loop filter $940_1$ and second loop filter $940_2$ (for example), but their characteristics adjusted so that one outputs values suitable for AFC 1 and the other outputs values suitable for AFC 3. Furthermore, any one or more of the units represented in FIG. 10 may be omitted and/or replaced with different units in order to achieve a different performance characteristic for the output AFC signal.

FIG. 11 visualises example steps of a method of simultaneously monitoring a plurality of RF communications frequency. In Step S1110, an RF signal 215 at any of the plurality of RF communications frequencies is received at a sub-sampler 220 along with a first oscillating signal 245 having a first oscillator frequency. In Step S1120, the sub-sampler 225 generates a sub-sampled signal 225 by sub-sampling the RF signal 215 using the first oscillating signal 245. In Step S1130, the sub-sampled signal 225 is demodulated and in step S1140 a digital code is recovered from the demodulated signal.

The skilled person will readily appreciate that various alterations or modifications may be made to the above described aspects of the disclosure without departing from the scope of the disclosure.

For example, whilst the RF receiver circuit 200 described above shows the demodulators 660 operating in the analog domain and digital conversion taking place on the demodulated signal using comparators $680_1$ and $680_2$, analog to digital conversion may instead take place earlier in the signal chain. For example, the signal processing system 230 may operate entirely in the digital domain, with the sub-sampled signal 225 first being converted to a digital signal. The digital sub-sampled signal 225 may then be demodulated in the digital domain by appropriate components in the first (or second) demodulation path $610_1$, with the digital code then recovered from the demodulated sub-sampled signal.

In the example above the digital processing unit 690 outputs a wake-up assertion signal. Additionally or alternatively, it may output the recovered digital signal, for example if the RF receiver circuit 200 is not being used as a wake-up receiver 110 but is instead being used as a low-power RF receiver circuit for other types of communication.

In the above, the RF signal 215 and the sub-sampled signal 225 are often described as being at a frequency. When those signals use FSK/GFSK to encode a digital code, it should be understood that the frequency of the RF signal 215 or sub-sampled signal 225 is the centre, or carrier, frequency of those signals, rather than the upper or lower FSK/GFSK frequency. Furthermore, it will be appreciated that where filters are designed to allow a particular frequency to pass through the filter, the frequency response of the filter will be such that an FSK/GFSK signal centred on that particular frequency will be allowed to pass through the filter (i.e., both the upper and lower FSK/GFSK frequencies of that signal will fall within the pass band frequency range of the filter).

In the examples described above, the RF receiver circuit 200 is configured to monitor two or more different RF frequencies. However, in an alternative, it can be configured to monitor one or more BLE frequencies, on which may be received a GFSK signal encoding a digital code that is recovered by the RF receiver circuit 200. As a result, the RF receiver circuit 200 can be used for a BLE wake-up receiver, monitoring any one or more of the BLE advertising channels and using the recovered digital code to determine whether or not to assert a wake-up signal. It has not previously been possible to implement a wake-up receiver that recovers a digital code according to the BLE standards since wake-up receivers capable of recovering digital codes have in the past typically been too high power to meet the BLE standards. However, the RF receiver circuit 200 described herein is sufficiently low power to conform to BLE standards.

Furthermore, in the BLE example described above, the RF receiver circuit 200 monitors the three primary advertising channels Ch 37, Ch 38 and Ch 39 (2402 MHz, 2426 MHz and 2480 MHz), However, in addition, or as an alternative, to monitoring any one or more of the primary advertising channels, the RF receiver circuit 200 may monitor any one or more of the secondary BLE advertising channels.

Furthermore, the RF receiver circuit 200 is not limited to monitoring only advertising channel frequencies according to the BLE standard, but may be configured to monitor any one or more RF frequencies, for any purpose and according to any standard/protocol.

The terminology "coupled" used above encompasses both a direct electrical connection between two components, and an indirect electrical connection where the two components are electrically connected to each other via one or more intermediate components.

The invention claimed is:

1. A radio-frequency, RF, receiver circuit, for monitoring simultaneously a plurality of frequencies, the RF receiver circuit comprising:
   a sub-sampler configured to:
      receive an RF signal at any of the plurality of RF frequencies;
      receive from a local oscillator a first oscillating signal having a first oscillator frequency; and sub-sample, using the first oscillating signal, the received RF signal in order to generate and output an analog sub-sampled signal; and a signal processing system coupled to an output of the sub-sampler and configured to:

receive the analog sub-sampled signal from the output of the sub-sampler;

demodulate the analog sub-sampled signal to produce a demodulated analog sub-sampled signal; and recover from the demodulated analog sub-sampled signal a digital code that is encoded within the RF signal.

2. The RF receiver circuit of claim 1, wherein the signal processing system comprises a first demodulation path coupled to the output of the sub-sampler via a first coupling path, the first demodulation path comprising:

a first demodulator having an operational center frequency that is a first intermediate frequency and being configured to demodulate the analog sub-sampled signal;

wherein the first oscillator frequency is such that for a first frequency of the plurality of frequencies, a frequency of the analog sub-sampled signal is the first intermediate frequency.

3. The RF receiver circuit of claim 2, wherein the first oscillator frequency is such that for a second frequency of the plurality of frequencies, the frequency of the analog sub-sampled signal is the first intermediate frequency.

4. The RF receiver circuit of claim 2, wherein the oscillator frequency is such that for a third frequency of the plurality of frequencies, the frequency of the analog sub-sampled signal is a second intermediate frequency.

5. The RF receiver circuit of claim 4, further comprising a second demodulation path coupled to the output of the sub-sampler, the second demodulation path comprising:

a mixer configured to modify the frequency of the analog sub-sampled signal such that when the frequency of the analog sub-sampled signal is the second intermediate frequency, an output of the mixer comprises a signal having a third intermediate frequency; and a second demodulator coupled to the output of the mixer and having an operational center frequency that is the third intermediate frequency, the second demodulator being configured to demodulate the signal having the third intermediate frequency.

6. The RF receiver of claim 5, wherein the second demodulation path further comprises a filter configured to allow signals at the third intermediate frequency to pass, wherein the second modulator is coupled to the output of the mixer via the filter such that the filter allows the signal at the third intermediate frequency to pass from the output of the mixer to the second demodulator.

7. The RF receiver of claim 5, wherein the third intermediate frequency is equal to the first intermediate frequency.

8. The RF receiver circuit of claim 5, wherein the mixer is further configured to:

receive a second oscillating signal having a second oscillator frequency; and mix the analog sub-sampled signal with the second oscillator signal, and wherein the RF receiver circuit further comprises a divider circuit configured to divide the first oscillating signal by a predetermined amount to generate the second oscillating signal.

9. The RF receiver of claim 2, wherein the digital code comprises a preamble portion, and wherein the RF receiver further comprises an automatic frequency control, AFC, determination circuit configured to:

determine, using the preamble portion of the digital code, a difference between a frequency of the signal demodulated by the first demodulator and the operational center frequency of the first demodulator; and determine a frequency error correction signal based on the difference between the frequency of the signal demodulated by the first demodulator and the operational center frequency of the first demodulator.

10. The RF receiver of claim 9, wherein the frequency error correction signal comprises an oscillator correction signal for use in adjusting the first oscillator frequency in such a way as to reduce the difference between the frequency of the signal demodulated by the first demodulator and the operational center frequency of the first demodulator.

11. The RF receiver of claim 9, wherein the frequency error correction signal comprises a first demodulation correction signal for use in adjusting a delay used by the first demodulator in such a way as to compensate for the difference between the frequency of the signal demodulated by the first demodulator and the operational center frequency of the first demodulator.

12. The RF receiver of claim 9, wherein the AFC determination circuit further comprises an inverter configured to set, prior to determining the frequency error correction signal, a sign of the difference between the frequency of the signal demodulated by the first demodulator and the operational center frequency of the first demodulator.

13. The RF receiver circuit of claim 1, wherein the RF receiver circuit is a wake-up receiver, and wherein the RF receiver circuit further comprises a wake-up assertion entity configured to:

compare the digital code to one or more predetermined wake-up codes; and if the digital code matches any of the one or more wake-up codes, output a wake-up assertion signal.

14. The RF receiver circuit of claim 1, further comprising an RF front end for coupling to an RF antenna and configured to filter a signal received from the RF antenna and output the RF signal to the sub-sampler, wherein the RF front end comprises a plurality of bandpass filters each centered on a respective one of the plurality of frequencies.

15. The RF receiver circuit of claim 1, wherein the sub-sampler comprises:

a switching circuit configured to receive the RF signal and output the analog sub-sampled signal; and a switching control circuit configured to control a timing of the switching circuit using the first oscillator signal, such that the RF signal is sampled by the switching circuit and the sub-sampler presents a substantially constant impedance at its input.

16. The RF receiver circuit of claim 15, wherein the switching circuit comprises:

a first sampling path comprising a first sampling device; and a second sampling path comprising a second sampling device;

wherein the switching circuit is configured to be controllable by the switching control circuit to alternate between:

a first state wherein the switching circuit presents the first sampling device at the input of the sub-sampler such that the RF signal is applied to the first sampling device and presents the second sampling device at the output of the sub-sampler such that a preceding sample is output from the second sampling device as the analog sub-sampled signal; and a second state wherein the switching circuit presents the second sampling device at the input of the sub-sampler such that the RF signal is applied to the second sampling device and presents the first sampling device at the output of the sub-sampler such that a preceding sample is output from the first sampling device as the analog sub-sampled signal.

17. The RF receiver circuit of claim 16, wherein the switching control circuit is configured to operate the switching circuit in the first state for a first amount of time and the second state for a second amount of time, wherein the first amount of time and the second amount of time are of equal duration, and wherein the duration of the first amount of time and the second amount of time is a multiple of a period of the first oscillator signal.

18. The RF receiver of claim 17, wherein the first sampling device and second sampling device are capacitors having the same impedance.

19. The RF receiver circuit of claim 1, wherein each of the plurality of frequencies are Bluetooth Low Energy, BLE, advertising frequencies, and wherein the digital code is encoded within the RF signal using a Gaussian frequency shift key, GFSK, modulation scheme.

20. The RF receiver circuit of claim 1, included in a Bluetooth Low Energy, BLE, wake-up receiver for use in a wireless communications device, the wake-up receiver being configured to:

receive a radio frequency, RF, signal on a BLE advertising frequency, wherein the RF signal is modulated with a digital code using a Gaussian frequency shift key, GFSK, modulation scheme according to the BLE standard;

recover the digital code from the RF signal;

compare the digital code to one or more predetermined wake-up codes; and if the digital code matches any of the one or more predetermined wake-up codes, output a wake-up signal to one or more other units within the wireless communications device.

21. A method for simultaneously monitoring a plurality of RF communications frequencies, the method comprising:

receiving, at a sub-sampler, an RF signal at any of the plurality of RF communications frequencies and a first oscillating signal having a first oscillator frequency;

sub-sampling the RF signal using the first oscillating signal in order to generate and output an analog sub-sampled signal;

demodulating the analog sub-sampled signal to produce a demodulated analog sub-sampled signal; and recovering from the demodulated analog sub-sampled signal a digital code that is encoded within the RF signal.

* * * * *